(12) United States Patent
Cho et al.

(10) Patent No.: US 11,909,053 B2
(45) Date of Patent: Feb. 20, 2024

(54) RESIN COMPOSITION AND BATTERY MODULE COMPRISING THE SAME

(71) Applicant: LG Chem, Ltd., Seoul (KR)

(72) Inventors: Yoon Gyung Cho, Daejeon (KR); Se Woo Yang, Daejeon (KR); Yang Gu Kang, Daejeon (KR); Eun Suk Park, Daejeon (KR); Hyun Suk Kim, Daejeon (KR); Hyoung Sook Park, Daejeon (KR); Sang Min Park, Daejeon (KR); Young Jo Yang, Daejeon (KR)

(73) Assignee: LG Chem, Ltd. (KR)

( * ) Notice: Subject to any disclaimer, the term of this patent is extended or adjusted under 35 U.S.C. 154(b) by 832 days.

(21) Appl. No.: 16/965,092

(22) PCT Filed: Feb. 19, 2019

(86) PCT No.: PCT/KR2019/001961
§ 371 (c)(1),
(2) Date: Jul. 27, 2020

(87) PCT Pub. No.: WO2019/203431
PCT Pub. Date: Oct. 24, 2019

(65) Prior Publication Data
US 2021/0028414 A1 Jan. 28, 2021

(30) Foreign Application Priority Data
Apr. 20, 2018 (KR) .................. 10-2018-0046255

(51) Int. Cl.
| | | |
|---|---|---|
| H01M 50/116 | (2021.01) | |
| H01M 50/278 | (2021.01) | |
| C08G 18/42 | (2006.01) | |
| C08G 18/32 | (2006.01) | |
| C08G 18/73 | (2006.01) | |
| C08G 18/66 | (2006.01) | |
| C08K 3/22 | (2006.01) | |
| H01M 50/211 | (2021.01) | |
| H01M 50/227 | (2021.01) | |
| B60L 50/60 | (2019.01) | |

(52) U.S. Cl.
CPC ....... *H01M 50/116* (2021.01); *C08G 18/3206* (2013.01); *C08G 18/4277* (2013.01); *C08G 18/664* (2013.01); *C08G 18/73* (2013.01); *C08K 3/22* (2013.01); *H01M 50/211* (2021.01); *H01M 50/227* (2021.01); *H01M 50/278* (2021.01); *B60L 50/60* (2019.02); *C08K 2003/2227* (2013.01)

(58) Field of Classification Search
CPC ............. H01M 50/116; H01M 50/211; H01M 50/227; H01M 50/278; H01M 10/653; H01M 50/24; H01M 50/249; H01M 2220/20; C08G 18/3206; C08G 18/4277; C08G 18/664; C08G 18/73; C08G 18/4211; C08G 18/423; C08G 18/75; C08K 3/22; C08K 2003/2227; C08K 3/013; B60L 50/60; B60L 50/50; B60L 58/21; Y02T 10/70; C08L 75/06; Y02E 60/10; B60Y 2200/91

See application file for complete search history.

(56) References Cited

U.S. PATENT DOCUMENTS

| | | | |
|---|---|---|---|
| 4,680,214 A | 7/1987 | Frisch et al. | |
| 2002/0169227 A1 | 11/2002 | Allen et al. | |
| 2007/0117947 A1 | 5/2007 | Wehner | |
| 2007/0282089 A1 | 12/2007 | Spyrou | |
| 2011/0061915 A1 | 3/2011 | Sekito | |
| 2014/0220264 A1 | 8/2014 | Park et al. | |
| 2014/0248497 A1* | 9/2014 | Takei | C08G 18/792 528/65 |
| 2015/0322195 A1 | 11/2015 | Makida et al. | |
| 2016/0215184 A1 | 7/2016 | Umino et al. | |
| 2016/0289358 A1 | 10/2016 | Gong et al. | |
| 2018/0076493 A1* | 3/2018 | Park | B60L 50/64 |

FOREIGN PATENT DOCUMENTS

| | | |
|---|---|---|
| CN | 1404503 A | 3/2003 |
| CN | 2585746 Y | 11/2003 |
| CN | 1930205 A | 3/2007 |
| CN | 102463679 A | 5/2012 |
| CN | 103013094 A | 4/2013 |
| CN | 103858180 A | 6/2014 |
| CN | 104011162 A | 8/2014 |
| CN | 104903370 A | 9/2015 |
| CN | 105764976 A | 7/2016 |

(Continued)

OTHER PUBLICATIONS

Extended European Search Report including Written Opinion for Application No. 19787716.0 dated Apr. 28, 2021, 13 pages.
Chinese Search Report for Application No. 201980015020.7 dated Sep. 27, 2021, pp. 1-4.
Feng-Lin, L. et al., "Influence of polyurethane sealant on shear bond strength of ceramic and dentin," Journal of Clinical Rehabilitative, Tissue Engineering Research, Jul. 16, 2010, pp. 5391-5394, vol. 14, No. 29. (Providing English Translation of Abstract only).
International Search Report for Application No. PCT/KR2019/001961 dated May 29, 2019, 2 pages.

*Primary Examiner* — Muhammad S Siddiquee
(74) *Attorney, Agent, or Firm* — Lerner David LLP

(57) ABSTRACT

The present application relates to a resin composition, a battery module comprising a cured product of the resin composition, a manufacturing method thereof and a battery pack. According to one example of the present application, injection processability of the resin composition can be improved, overloading of injection equipment can be prevented, and the battery module having excellent insulation properties can be provided.

18 Claims, 9 Drawing Sheets

(56) References Cited

FOREIGN PATENT DOCUMENTS

| | | | |
|---|---|---|---|
| CN | 107431147 | A | 12/2017 |
| DE | 10262200 | B4 | 7/2011 |
| EP | 1054046 | A2 | 11/2000 |
| EP | 3626770 | A1 | 3/2020 |
| EP | 3670558 | A1 | 6/2020 |
| EP | 3670559 | A1 | 6/2020 |
| EP | 3674339 | A1 | 7/2020 |
| EP | 3678212 | A1 | 7/2020 |
| EP | 3680952 | A1 | 7/2020 |
| EP | 3686230 | A1 | 7/2020 |
| JP | H05237363 | A | 9/1993 |
| JP | H07033477 | B2 | 4/1995 |
| JP | 2010006926 | A | 1/2010 |
| JP | 5422802 | B2 | 2/2014 |
| KR | 20110013413 | A | 2/2011 |
| KR | 20160051750 | A | 5/2016 |
| KR | 20160105355 | A | 9/2016 |
| KR | 20160105358 | A | 9/2016 |
| KR | 20160145532 | A | 12/2016 |
| WO | 8705541 | A1 | 9/1987 |
| WO | 9950324 | A1 | 10/1999 |
| WO | 0162842 | A1 | 8/2001 |
| WO | 2013054659 | A1 | 4/2013 |

\* cited by examiner

[FIG.1]
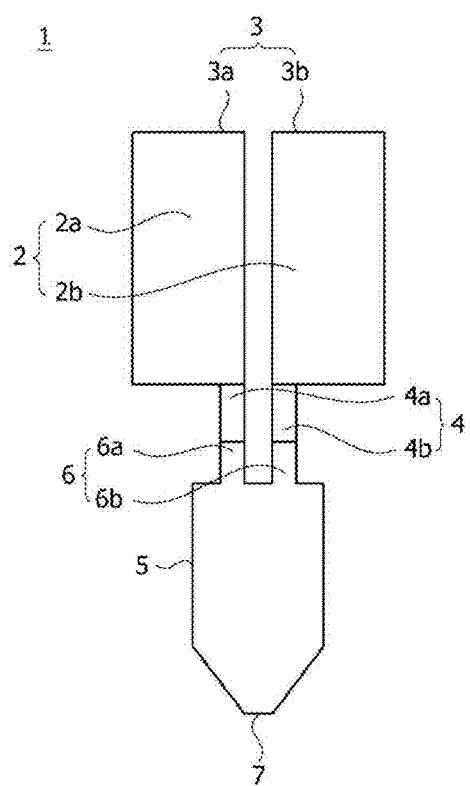

[FIG. 2]
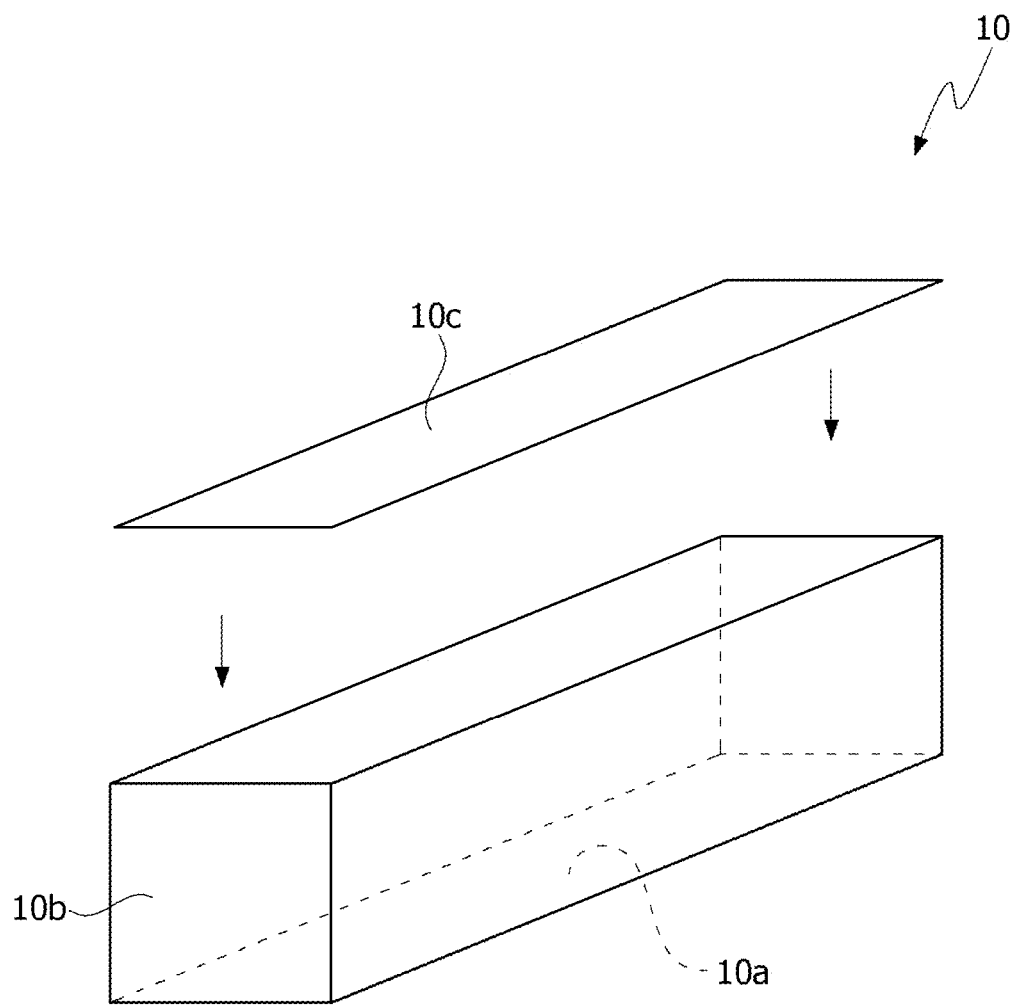

[FIG. 3]
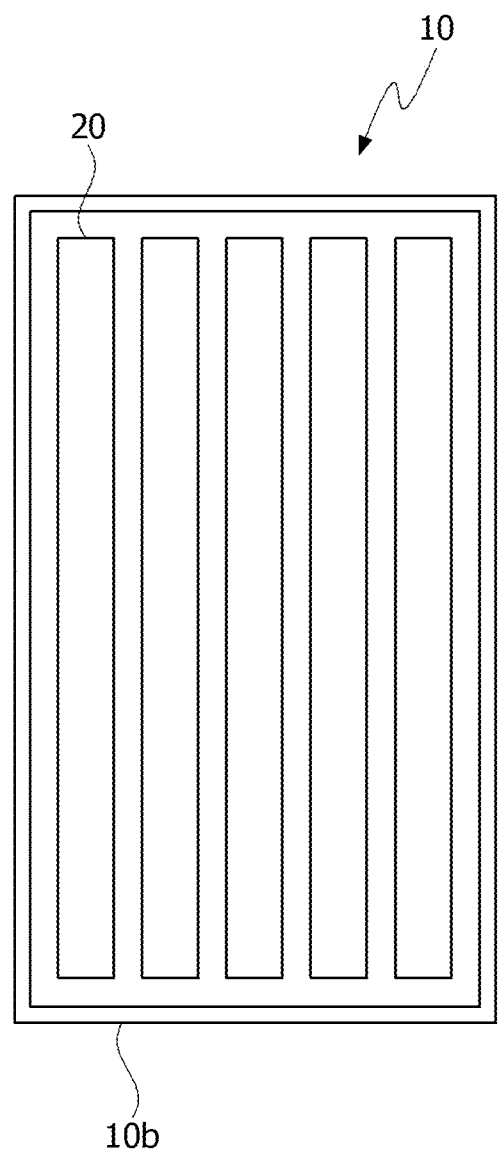

[FIG. 4]
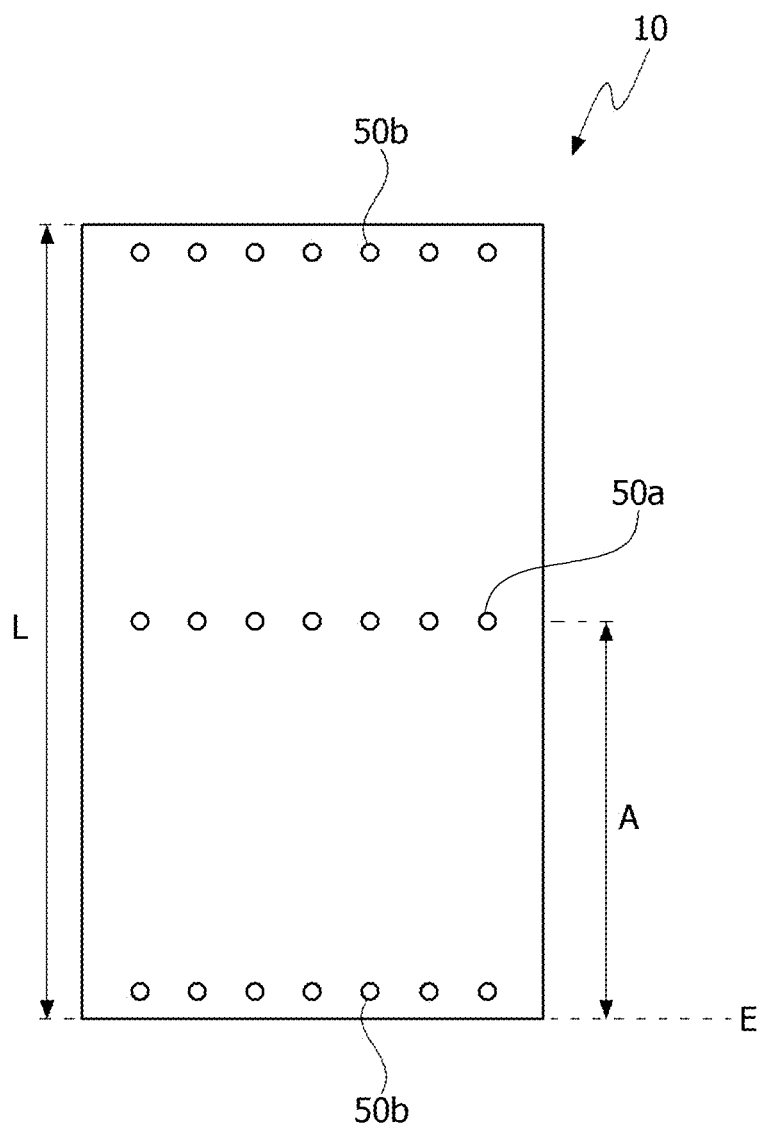

[FIG. 5]
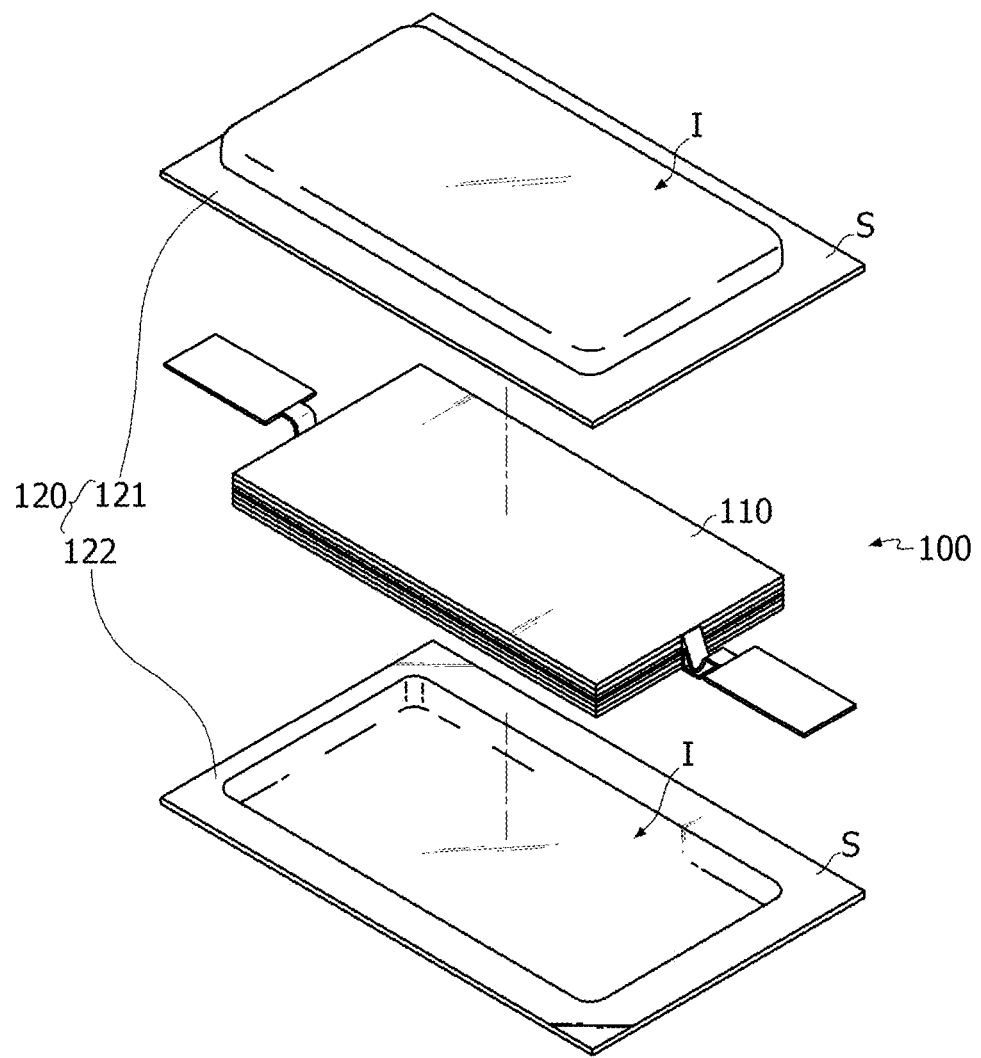

[FIG. 6]
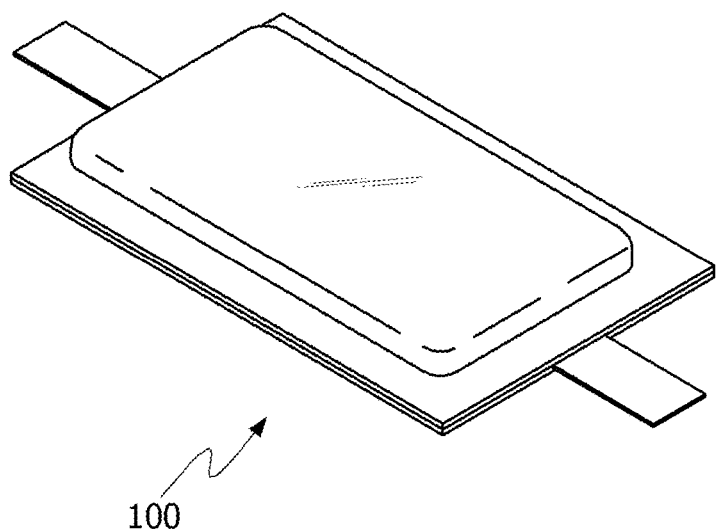
[FIG. 7]
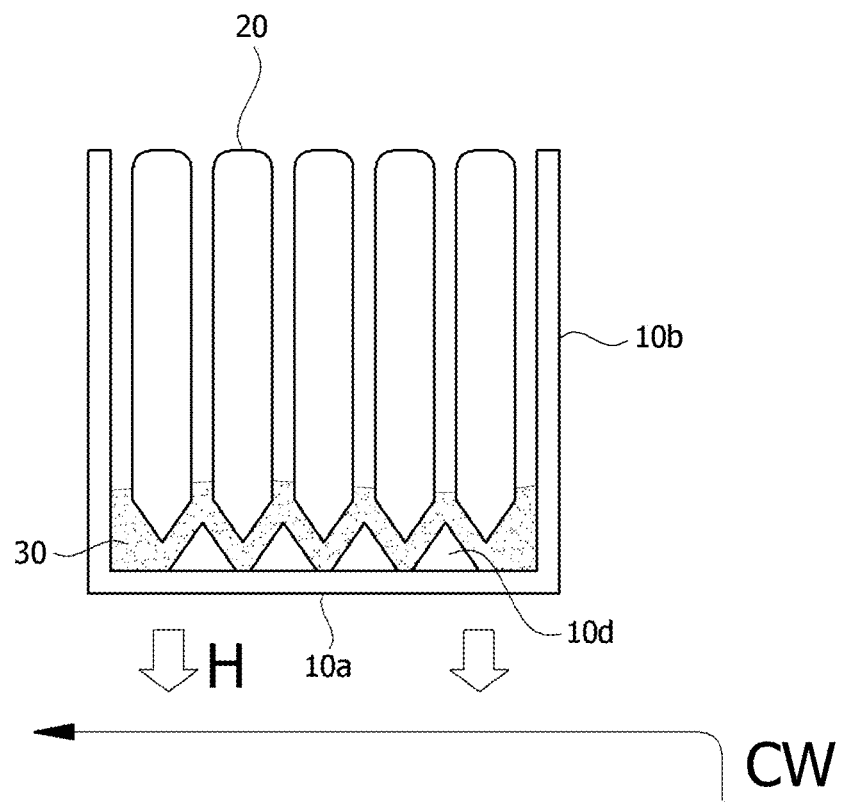

[FIG. 8]
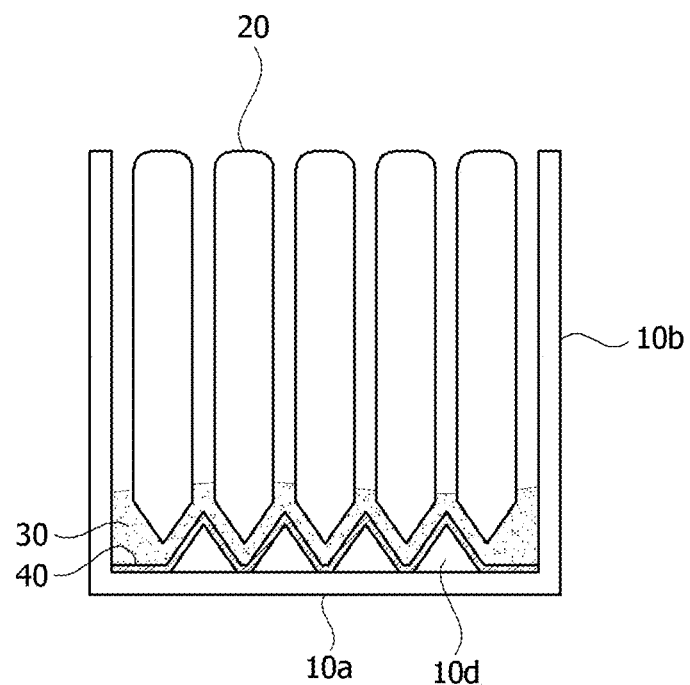

[FIG. 9]
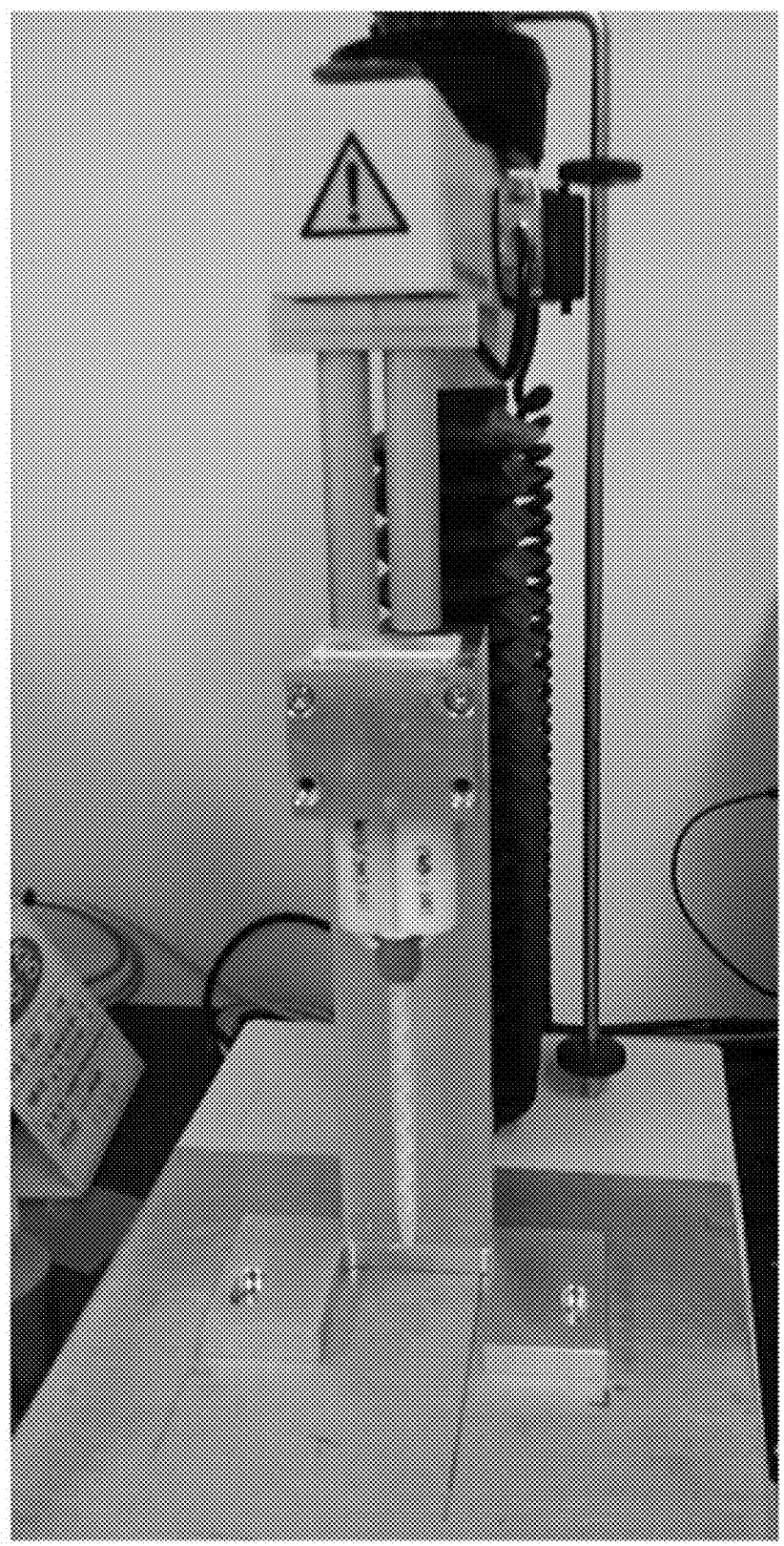

[FIG. 10]
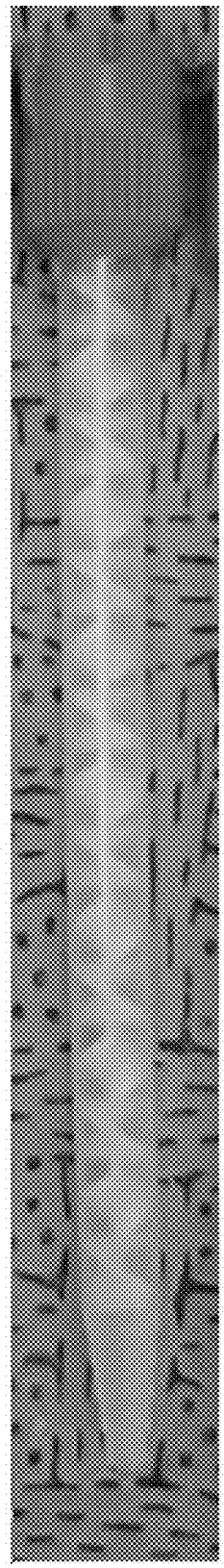

RESIN COMPOSITION AND BATTERY MODULE COMPRISING THE SAME

CROSS-REFERENCE TO RELATED APPLICATIONS

This application is a national phase entry under 35 U.S.C. § 371 of International Application No. PCT/KR2019/001961 filed Feb. 19, 2019, which claims priority from Korean Patent Application No. 10-2018-0046255 filed Apr. 20, 2018, all of which are incorporated herein by reference.

TECHNICAL FIELD

The present application relates to a resin composition. Specifically, the present application relates to a resin composition, a battery module comprising a cured product of the resin composition, a method for manufacturing the battery module, a battery pack, and an automobile.

BACKGROUND ART

A secondary battery includes a nickel cadmium battery, a nickel hydride battery, a nickel zinc battery, or a lithium secondary battery, and the like, where a typical example thereof is a lithium secondary battery.

The lithium secondary battery mainly uses lithium oxides and carbon materials as positive electrode and negative electrode active materials, respectively. The lithium secondary battery includes an electrode assembly in which a positive plate and a negative plate coated with a positive electrode active material and a negative electrode active material, respectively, are disposed with a separator interposed therebetween, and an exterior material in which the electrode assembly is sealed and housed together with an electrolyte, which can be classified as a can type secondary battery and a pouch type secondary battery depending on the kind of the exterior material. Such a single secondary battery can be referred to as a battery cell.

In the case of medium and large devices such as automobiles or power storage systems, in order to capacity and power, a battery module in which a large number of battery cells are electrically connected to each other may be used or a battery pack in which a plurality of such battery modules are connected may be used.

One of methods of constructing the battery module or the battery pack as above is to use an adhesive material capable of fixing a plurality of battery cells inside the battery module. At this time, the adhesive material can be injected into the battery module through an injection hole formed on the surface of the battery module.

DISCLOSURE

Technical Problem

One object of the present application is that in a resin composition which can be used for fixing a battery cell in a battery module, injection processability is improved and overload of the injection equipment is prevented.

Another object of the present application is to provide a composition that can provide excellent insulating property, adhesive force, heat generation, and the like, after being injected into a battery module and cured.

Another object of the present application is to provide a battery module comprising the cured product of the resin composition, a manufacturing method thereof and a battery pack.

Technical Solution

In one example related to the present application, the present application relates to a resin composition used for a battery module or a battery pack. Specifically, the composition of the present application may be a composition which is used to fix one or more battery cells in a battery module by being injected into the case of the battery module and contacting the battery cells present in the battery module, as described below.

In this connection, the resin composition, for example, the adhesive composition may be a resin composition comprising a main resin and a curing agent, and satisfying the following equations 1 and 2.

$$10 \leq \text{initial load value}(Li) \leq 40 \quad \text{[Equation 1]}$$

$$1 \leq \text{load change rate}(Lf/Li) \leq 3 \quad \text{[Equation 2]}$$

In Equations 1 and 2 above, Li is the initial load value (kgf) measured immediately after the main resin and the curing agent are mixed and Lf is the aging load value (kgf) measured at 3 minutes after the main resin and the curing agent are mixed, where the load values Li and Lf represent each the maximum value of the force required when the resin composition is discharged at a constant rate through a mixer having a constant cross section.

In the present application, the term "room temperature" is a state without particularly warming, which may mean any temperature within the range of about 10° C. to 30° C., such as a temperature of about 15° C. or higher, 18° C. or higher, 20° C. or higher, or about 23° C. or higher and about 27° C. or lower. Among physical properties mentioned herein, when the measured temperature influences the physical properties, the physical properties may be physical properties measured at room temperature, unless otherwise specified.

In the present application, with regard to the initial load value (Li) measured immediately after a main resin and a curing agent are mixed, the main resin and the curing agent are injected into two cartridges as described below, respectively, injected into a mixer as described below by pressurizing the cartridges at a uniform velocity of 1 mm/s by pressurizing means as described below, and mixed in the mixer and then the force required for the pressurizing means is measured from the first discharge time, whereby the maximum value at the point where the force has the maximum value is set as the initial load value (Li). The maximum value is the maximum value that is first confirmed in the process, which is the maximum value at the point where the required force is increased and then decreased initially, or the maximum value at the point where it is initially converged. Then, when the times at which the maximum value is confirmed by two pressurizing means are different, the initial load value (Li) is the maximum value that is first confirmed.

In the present application, with regard to the aging load value (Lf) measured at 3 minutes after a main resin and a curing agent are mixed, the main resin and the curing agent are each injected into a mixer by pressurizing means as described below, the pressurization is stopped at the time when the resin composition injected into the mixer becomes 95% or so of the capacity (volume) of the mixer, the mixer is again pressurized at a uniform velocity of 1 mm/s after the stopping time of 3 minutes has elapsed, and the required force is measured from the time when the resin composition is first discharged through a discharge part of the mixer, whereby the maximum value at the point where the force has the maximum value is set as the aging load value (Lf). The maximum value is the maximum value that is first confirmed in the process, which is the maximum value at the point where the required force is increased and then decreased initially, or the maximum value at the point where it is initially converged. Then, when the times at which the maximum value is confirmed by two pressurizing means are different, the aging load value (Lf) is the maximum value that is first confirmed.

After the main resin is charged into any one of two cartridges as described below and the curing agent is charged into the other cartridge, they are mixed at a mixer as described below via a discharge part of the cartridge as described below by applying a constant force by pressurizing means as described below and then the load value is measured while being discharged to a discharge part of the mixer as described below. The initial load value (Li) of the resin composition measured immediately after the main resin and the curing agent are mixed may be about 10 kgf or more to about 40 kgf or less. In one example, the initial load value (Li) may be about 10 kgf or more, 12 kgf or more, or about 14 kgf or more, and may be about 40 kgf or less, 38 kgf or less, or about 36 kgf or less.

Furthermore, the aging load value (Lf) measured at 3 minutes after the main resin and the curing agent are mixed may be about 50 kgf or less, and the lower limit thereof may be, for example, about 20 kgf or more. In one example, the aging load value measured after 3 minute curing may be about 50 kgf or less, or about 48 kgf, and may be about 20 kgf or more, 22 kgf or more, or about 24 kgf or more.

Such load values are particularly advantageous in forming a battery module having a specific structure as described below, and excessively low load values may cause overflow after injection or deteriorate storage stability of the resin composition. In addition, excessively high load values may impose a strain on the injection equipment of the resin composition to shorten the life of the equipment, or may deteriorate the productivity of the battery module.

In one example, the resin composition may have a load change rate in a range of about 1 or more to about 3 or less. In the present application, the term load change rate is a ratio of an initial load value (Li) measured immediately after the main resin and the curing agent are mixed relative to an aging load value (Lf) measured at 3 minutes after the main resin and the curing agent are mixed. That is, it may be defined as Lf/Li.

The load change rate of more than 3 means that the increase of the load value is great, which means that the curing rate of the resin composition is fast, and thus may cause overloading of the injection equipment. On the other hand, the load change rate of less than 1 means that the increase of the load value is not large, which means that the curing rate of the resin composition is slow, and the productivity of the battery module may be deteriorated.

Therefore, when the initial load value (Li) of the resin composition satisfies Equation 1 above and the load change rate (Lf/Li) satisfies the range of Equation 2 above, the injection process of the resin composition is excellent and the overload of the injection equipment can be prevented.

In the present application, the Li and Lf can be referred to as a temporary curing load value. In the present application, the temporary curing may mean that the resin composition does not reach a real curing state, where the real curing state means a state that in order to manufacture a battery module, the material injected into the module can be regarded as having been cured enough to function as an adhesive imparted with a function such as actual heat dissipation. Taking a urethane resin as an example, the real curing state can be confirmed from the fact that a conversion rate based on the NCO peak around 2250 $cm^{-1}$ is 80% or more, which is determined by a FT-IR analysis on the basis of the curing at room temperature and 30 to 70% relative humidity for 24 hours.

In the present application, the mixing machine may comprise two cartridges and one mixer associated with the cartridges. FIG. 1 is a cross-sectional view showing an exemplary mixing machine (1) of the present application. The mixing machine (1) may be composed of two cartridges (2a, 2b) and one mixer (5).

The cartridge (2) is not particularly limited and a known cartridge can be used as long as it can accommodate a main resin and a curing agent. In one embodiment, the cartridge (2a, 2b) accommodating the main resin or the curing agent is in a form of a circle with a diameter of about 15 mm to about 20 mm, and a discharge portion of a first discharge part (4a, 4b) discharging the main resin or the curing agent is in a form of a circle with a diameter of about 2 mm to about 5 mm, where the height may be about 80 mm to 300 mm and the total volume may be 10 ml to 100 ml.

The cartridge (2a, 2b) may have pressurizing means (3a, 3b). The pressurizing means (3a, 3b) is not particularly limited, and a known pressurizing means (3a, 3b) can be used. For example, the pressurizing means may use a TA (texture analyzer). The pressurizing means (3a, 3b) can pressurize the cartridges (2a, 2b) to discharge the main resin and the curing agent inside the cartridges through the mixer (5). The pressing speed of the pressurizing means (3a, 3b) may be about 0.01 to about 1 mm/s. For example, the pressing speed may be about 0.01 mm/s or more, 0.05 mm/s or more, or about 0.1 mm/s or more, and may be about 1 mm/s or less, 0.8 mm/s or less, 0.6 mm/s or less, 0.4 mm/s or less, or about 0.2 mm/s or less. On the other hand, the mixer (5) is not particularly limited as long as it can mix a resin composition discharged by two cartridges, and a known mixer can be used. For example, the mixer may be a static mixer (5). In one embodiment, the static mixer (5) has two receiving parts (6a, 6b) for receiving the main resin and the curing agent from two cartridges (2a, 2b), respectively, and one second discharge part (7) for discharging the resin composition mixed by the static mixer (5), where the receiving parts (6a, 6b) is in a form of a circle with a diameter of about 2 mm to about 5 mm and the second discharge part (7) is in a form of a circle with a diameter of 1 mm to 3 mm, and the number of elements may be about 5 to about 20. On the other hand, the mixer (5) may have a capacity satisfying the range of the following equation 3.

$$V < t2/td * Q \qquad \text{[Equation 3]}$$

In Equation 3 above, V is the capacity of the static mixer, t2 is a time when the viscosity of the resin composition is doubled, td is a dispensing process time, and Q is an injection amount per process unit time. When the capacity of the static mixer is large relative to the time (t2) when the viscosity is doubled, the time to retain exceeding the amount used per unit process is increased, so that the viscosity is increased and the process speed is slowed down or in severe cases, the mixer is likely to block due to curing.

In one example, the viscosity value of the resin composition may be about 500,000 cP or less. The lower limit may be, for example, about 150,000 cP or more. In one example, the viscosity value of the resin composition may be about 450,000 cP or less, 400,000 cP or less, or about 350,000 cP or less, and may be about 160,000 cP or more, 180,000 cP or more, or about 200,000 cP or more. When the relevant range is satisfied, it is advantageous to satisfy Equations 1 and 2 above, whereby appropriate processability can be ensured.

On the other hand, in the present application, unless otherwise mentioned, when a viscosity is measured in a shear rate range of 0.01 to 10.0/s using a rheological property measuring device (ARES) at room temperature within 60 seconds after mixing the main resin and the curing agent, it is the viscosity value measured at a point of 2.5/s.

In one example, the thixothropic index of the resin composition may be about 1.5 or more, and the upper limit may be, for example, about 5.0 or less. In one example, the thixotropic index may be about 1.5 or more, 1.6 or more, or about 1.7 or more, and may be about 5.0 or less, 4.5 or less, 4.0 or less, or about 3.5 or less.

The thixotropic index indicates a viscosity ratio of the resin composition. In the present application, when the thixotropic index is measured in a shear rate range of 0.01 to 10.0/s using a rheological property measuring device (ARES) at room temperature, it indicates a viscosity ratio of the resin composition measured at a point having a shear rate of 0.25/s and a point having a shear rate of 2.5/s.

The thixotropic index of less than 1.5 is not suitable for use in an injection process because the difference between the viscosity of the resin composition at a point having a shear rate of 0.25/s and the viscosity of the resin composition at a point of 2.5/s is not large, and even the resin composition having the same viscosity is not preferable because the flow may occur before curing. On the other hand, if the viscosity of the resin composition at the point of 2.5/s is small, overflow may occur in a pressurizing device that pressurizes the resin composition in the mixing machine and injects it into the battery module due to insufficient curing of the resin composition. Therefore, when the thixotropic index is in the range of about 1.5 or more to about 5.0 or less, appropriate processability can be secured.

The type of the resin composition is not particularly limited as long as it has the load value of Equation 1 and the load change ratio of Equation 2 and has adhesion suitable for its use after curing.

In one example, as the resin composition, a room temperature curing composition may be used as the resin composition. The room temperature curing composition means a composition having a system capable of exhibiting a predetermined adhesive ability through a curing reaction at room temperature, which may be, for example, a two-component resin composition comprising a main resin and a curing agent. As the main resin, a silicone resin, a polyol resin, an epoxy resin or an acrylic resin may be used. On the other hand, as the curing agent, a known curing agent suitable for the main resin may be used. In one example, when the main resin is a silicone resin, a siloxane compound may be used as the curing agent; when the main resin is a polyol resin, an isocyanate compound may be used as the curing agent; when the main resin is an epoxy resin, an amine compound may be used as the curing agent; and when the main resin is an acrylic resin, an isocyanate compound may be used as the curing agent.

In one example, the main resin may have a viscosity of about 10,000 cP or less. Specifically, the main resin may have a viscosity of about 8,000 cP or less, 6,000 cP or less, 4,000 cP or less, 2,000 cP or less, or about 1,000 cP or less. Preferably, the upper limit of the viscosity may be about 900 cP or less, 800 cP or less, 700 cP or less, 600 cP or less, 500 cP or less, or about 400 cP or less. Although not particularly limited, the viscosity lower limit of the main resin may be about 50 cP or more, or about 100 cP or more. If the viscosity is too low, the processability may be good, but as the molecular weight of the raw material is low, the possibility of volatilization may increase, and heat resistance/cold resistance, flame retardance and adhesive force may be deteriorated, where such disadvantages can be prevented by satisfying the lower limit range. The viscosity of the resin can be measured at room temperature, for example, using a Brookfield LV type viscometer.

In one example, the resin composition may be a two-component urethane-based composition. When the two-component urethane-based composition is used, the composition may have the following constitutions. In the case of the two-component polyurethane, a main material comprising a polyol and the like and a curing agent comprising an isocyanate and the like may react at room temperature and be cured. The curing reaction may be assisted by a catalyst such as, for example, dibutyltin dilaurate (DBTDL). Accordingly, the two-component urethane-based composition may comprise a physical mixture of a main component (polyol) and a curing agent component (isocyanate), and/or may comprise a reactant (cured product) of the main component and the curing agent component.

The two-component urethane-based composition may comprise a main resin comprising at least a polyol resin and a curing agent containing at least an isocyanate. Accordingly, the cured product of the resin composition may comprise both the polyol-derived unit and the polyisocyanate-derived unit. At this time, the polyol-derived unit may be a unit which is formed by urethane-reacting the polyol with the polyisocyanate, and the polyisocyanate-derived unit may be a unit which is formed by urethane-reacting the polyisocyanate with the polyol.

The main resin and the curing agent may each comprise a filler. For example, in order to ensure thixotropy as required in the process and/or to ensure heat dissipation (thermal conductivity) within the battery module or the battery pack, the composition of the present application may comprise an excess of fillers, as described below. The details will be described in detail in the following related description.

In one example, an ester polyol resin may be used as the polyol resin contained in the main resin. When the ester polyol resin is used, it may be advantageous to secure excellent adhesion and adhesion reliability in a battery module after curing the resin composition.

In one example, as the ester polyol resin, for example, a carboxylic acid polyol or a caprolactone polyol may be used.

The carboxylic acid polyol can be formed by reacting components comprising a carboxylic acid and a polyol (e.g., diol or triol), and the caprolactone polyol can be formed by reacting components comprising a caprolactone and a polyol (e.g., diol or triol). At this time, the carboxylic acid may be a dicarboxylic acid.

In one example, the polyol resin may be a polyol resin represented by the following formula 1 or 2.

[Formula 1]

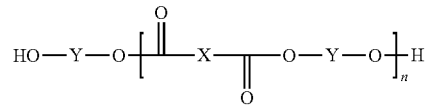

-continued

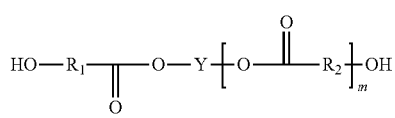
[Formula 2]

In Formulas 1 and 2, X is a carboxylic acid-derived unit, and Y is a polyol-derived unit. The polyol-derived unit may be, for example, a triol unit or a diol unit. In addition, n and m may be any number, and for example, n is a number in a range of 2 to 10, m is a number in a range of 1 to 10, and $R_1$ and $R_2$ are each independently an alkylene having 1 to 14 carbon atoms.

As used herein, the term "carboxylic acid-derived unit" may mean a moiety other than the carboxyl group in the carboxylic acid compound. Similarly, as used herein, the term "polyol-derived unit" may mean a moiety other than the hydroxyl group in the polyol compound structure.

That is, when the hydroxyl group of the polyol reacts with the carboxyl group of the carboxylic acid, the water ($H_2O$) molecule is eliminated by condensation reaction to form an ester bond. Thus, when the carboxylic acid forms the ester bond by the condensation reaction, the carboxylic acid-derived unit may mean a moiety of the carboxylic acid structure which does not participate in the condensation reaction. Furthermore, the polyol-derived unit may mean a moiety of the polyol structure which does not participate in the condensation reaction.

In addition, after the polyol forms an ester bond with caprolactone, Y in Formula 2 also represents a moiety excluding the ester bond. That is, when the polyol and the caprolactone form an ester bond, the polyol-derived unit in Formula 2, Y may mean a moiety of the polyol structure which does not participate in the ester bond. The ester bonds are represented in Formulas 1 and 2, respectively.

On the other hand, when the polyol-derived unit of Y in Formulas above is a unit derived from a polyol having three or more hydroxyl groups such as a triol unit, a branched structure may be realized in the Y part in the formula structure.

In Formula 1 above, the kind of the carboxylic acid-derived unit of X is not particularly limited, but in order to secure desired physical properties, it may be a unit derived from one or more compounds selected from the group consisting of a fatty acid compound, an aromatic compound having two or more carboxyl groups, an alicyclic compound having two or more carboxyl groups and an aliphatic compound having two or more carboxyl groups.

In one example, the aromatic compound having two or more carboxyl groups may be phthalic acid, isophthalic acid, terephthalic acid, trimellitic acid or tetrachlorophthalic acid.

In one example, the alicyclic compound having two or more carboxyl groups may be tetrahydrophthalic acid, or hexahydrophthalic acid.

Also, in one example, the aliphatic compound having two or more carboxyl groups may be oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid or itaconic acid.

From the viewpoint of a low glass transition temperature in the above-described range, an aliphatic carboxylic acid-derived unit may be preferable to an aromatic carboxylic acid-derived unit.

On the other hand, in Formulas 1 and 2, the kind of the polyol-derived unit of Y is not particularly limited, but in order to secure desired physical properties, it may be derived from one or more compounds selected from the group consisting of an alicyclic compound having two or more hydroxyl groups and an aliphatic compound having two or more hydroxyl groups.

In one example, the alicyclic compound having two or more hydroxyl groups may be 1,3-cyclohexane dimethanol or 1,4-cyclohexane dimethanol.

Also, in one example, the aliphatic compound having two or more hydroxyl groups may be ethylene glycol, propylene glycol, 1,2-butylene glycol, 2,3-butylene glycol, 1,3-propanediol, 1,3-butanediol, 1,4-butanediol, 1,6-hexanediol, neopentyl glycol, 1,2-ethylhexyldiol, 1,5-pentanediol, 1,9-nonanediol, 1,10-decanediol, glycerin or trimethylol propane.

On the other hand, in Formula 1 above, n is any number, and the range may be selected in consideration of the desired physical properties of the resin composition or a resin layer, which is the cured product thereof. For example, n may be about 2 to 10 or 2 to 5.

Also, in Formula 2 above, m is any number, and the range may be selected in consideration of the desired physical properties of the resin composition or a resin layer, which is the cured product thereof. For example, m is about 1 to 10 or 1 to 5.

If n and m in Formulas 1 and 2 are outside the above ranges, the crystallizability expression of the polyol becomes stronger, which may adversely affect the injection processability of the composition.

In Formula 2, $R_1$ and $R_2$ are each independently an alkylene having 1 to 14 carbon atoms. The number of carbon atoms can be selected in consideration of the desired physical properties of the resin composition or a resin layer which is the cured product thereof.

The molecular weight of the polyol may be adjusted in consideration of low-viscosity characteristics, durability or adhesion, and the like, as described below, which may be within a range of, for example, about 300 to 2,000. Unless otherwise specified, in this specification, the "molecular weight" may be a weight average molecular weight (Mw) measured using GPC (gel permeation chromatograph). If it is out of the above range, the reliability of the resin layer after curing may be poor and problems related to volatile components may occur.

In the present application, the kind of the polyisocyanate contained in the curing agent is not particularly limited, but in order to secure desired physical properties, a non-aromatic isocyanate compound containing no aromatic group can be used. When an aromatic polyisocyanate is used, the reaction rate may be too fast and the glass transition temperature of the cured product may be increased, so that it may be difficult to ensure the processability and physical properties suitable for the use of the composition of the present application.

As the non-aromatic isocyanate compound, for example, an aliphatic polyisocyanate such as hexamethylene diisocyanate, trimethylhexamethylene diisocyanate, lysine diisocyanate, norbornane diisocyanate, ethylene diisocyanate, propylene diisocyanate or tetramethylene diisocyanate; an alicyclic polyisocyanate such as transcyclohexane-1,4-diisocyanate, isophorone diisocyanate, bis(isocyanatomethyl) cyclohexane diisocyanate or dicyclohexylmethane diisocyanate; or one or more carbodiimide-modified polyisocyanates or isocyanurate-modified polyisocyanates of the foregoing;

and the like may be used. Also, a mixture of two or more of the above-listed compounds may be used.

The ratio of the polyol-derived resin component to the polyisocyanate-derived resin component in the resin composition is not particularly limited, which can be appropriately adjusted so that the urethane reaction between them can be performed.

As described above, an excess of fillers may be included in the composition, for securing heat dissipation (thermal conductivity) or thixotropy as required in the process, where if an excess of fillers is used, the viscosity of the composition increases, so that the processability at the time of injecting the composition into the case of the battery module may be deteriorated. Therefore, it requires low-viscosity properties sufficient to not interfere with the processability, while comprising an excess of fillers. In addition, when merely showing a low viscosity, it is also difficult to ensure the processability, so that it may be necessary that appropriate thixotropy is required, excellent adhesive force is exhibited when cured and the curing itself proceeds at room temperature. Then, the ester polyol is advantageous for securing the adhesion after curing, but is highly cryatalline, so that there is a high possibility of becoming a wax state at room temperature and there is a disadvantage in securing proper injection processability due to viscosity increase. Even if it is used by lowering the viscosity through melting, the viscosity increase by crystallization in the injection or application process of the composition, which can be continued after mixing with fillers, occurs due to crystallizability occurring naturally in the storage process, and as a result, the processability may be lowered. In view of this point, the ester polyol used in the present application can satisfy the following characteristics.

In the present application, the ester polyol may be an amorphous or sufficiently low crystalline polyol. As used herein, the meaning of the term "amorphous" is well known to those skilled in the art. For example, the "amorphous" means a case where the crystallization temperature (Tc) and the melting temperature (Tm) are not observed in a DSC (differential scanning calorimetry) analysis. At this time, the DSC analysis can be performed at a rate of 10° C./minute within a range of −80° C. to 60° C., and for example, a method can be performed, in which the temperature is raised from 25° C. to 60° C. at the above rate, and then the temperature is reduced to −80° C. again and raised to 60° C. again. Here, the "sufficiently low crystalline" means a case where the melting point (Tm) observed in the DSC analysis is less than 15° C., which is about 10° C. or lower, 5° C. or lower, 0° C. or lower, −5° C. or lower, −10° C. or lower, or about −20° C. or lower or so. At this time, the lower limit of the melting point is not particularly limited, but for example, the melting point may be about −80° C. or higher, about −75° C. or higher, or about −70° C. or higher. When the polyol is crystalline or has high (room temperature) crystallizability, such as not satisfying the melting point range, the viscosity difference depending on the temperature easily increases, so that in the process of mixing the filler and the resin, the dispersion degree of the filler and the viscosity of the final mixture may be adversely affected, the processability is lowered, and as a result, it may become difficult to satisfy the cold resistance, the heat resistance and the water resistance required in the adhesive composition for a battery module.

In one example, the resin component contained in the urethane-based composition may have a glass transition temperature (Tg) of less than 0° C. after curing (real curing).

When the glass transition temperature range is satisfied, brittle characteristics can be secured in a relatively short time even at a low temperature where the battery module or the battery pack can be used, thereby ensuring impact resistance and vibration resistance characteristics. On the other hand, if the above range is not satisfied, the tacky property of the cured product may be excessively high or the thermal stability may be lowered. In one example, the lower limit of the glass transition temperature of the urethane-based composition after curing may be about −70° C. or higher, −60° C. or higher, −50° C. or higher, −40° C. or higher, or about −30° C. or higher, and the upper limit may be about −5° C. or lower, −10° C. or lower, −15° C. or lower, or about −20° C. or lower.

Furthermore, in the present application, an additive may be used in order to secure the use of the resin composition and the function required according to the use thereof. For example, the resin composition may comprise a predetermined filler in consideration of thermal conductivity, insulating property, heat resistance (TGA analysis), and the like of the resin layer. The form or method in which the filler is contained in the resin composition is not particularly limited. For example, the filler may be used to form a urethane-based composition in a state that it is contained in the main resin and/or the curing agent in advance. Alternatively, in the process of mixing the main resin and the curing agent, the separately prepared filler may also be used by a method that it is mixed together.

In one example, the filler included in the composition may be at least a thermally conductive filler. In the present application, the term thermally conductive filler may mean a material having a thermal conductivity of about 1 W/mK or more, 5 W/mK or more, 10 W/mK or more, or about 15 W/mK or more. Specifically, the thermal conductivity of the thermally conductive filler may be about 400 W/mK or less, about 350 W/mK or less, or about 300 W/mK or less. The kind of the usable thermally conductive filler is not particularly limited, but it may be a ceramic filler when insulating property and the like are considered together. For example, ceramic particles such as alumina ($Al_2O_3$), aluminum nitride, boron nitride, silicon nitride, SiC or BeO may be used. The shape or ratio of the filler is not particularly limited, which may be suitably adjusted in consideration of the viscosity of the urethane-based composition, the possibility of settling in the cured resin layer of the composition, the desired heat resistance or thermal conductivity, an insulating property, a filling effect or dispersability, and the like. Generally, the larger the size of the filler, the higher the viscosity of the composition comprising the same and the higher the possibility that the filler precipitates in the resin layer. Furthermore, the smaller the size, the thermal resistance tends to be increased. Therefore, the filler having an appropriate type and size may be selected in consideration of the above points, and two or more fillers may also be used, if necessary. Considering the filling amount, it is advantageous to use a spherical filler, but considering network formation or conductivity, a filler in a form such as needle-like morphology or flattened morphology may also be used.

In one example, the composition may comprise a thermally conductive filler having an average particle diameter in a range of about 0.001 μm to about 80 μm. In another example, the average particle diameter of the filler may be about 0.01 μm or more, 0.1 μm or more, 0.5 μm or more, 1 μm or more, 2 μm or more, 3 μm or more, 4 μm or more, 5 μm or more, or about 6 μm or more. In another example, the average particle diameter of the filler may be about 75 μm or less, 70 μm or less, 65 μm or less, 60 μm or less, 55 μm or less, 50 µm or less, 45 µm or less, 40 µm or less, 35 µm or less, 30 µm or less, 25 µm or less, 20 µm or less, 15 µm or less, 10 µm or less, or 5 µm or less.

In order to obtain excellent heat dissipation performance, it can be considered that a high content of the thermally conductive filler is used. For example, the filler may be used in an amount of about 50 to 2,000 parts by weight, relative to 100 parts by weight of the total resin components, that is, the sum of the ester polyol resin and polyisocyanate contents. In another example, the filler content may be used in excess of the total resin component. Specifically, the filler may be used in an amount of 100 parts by weight or more, 150 parts by weight or more, 200 parts by weight or more, 250 parts by weight or more, 300 parts by weight or more, 350 parts by weight or more, 400 parts by weight or more, 500 parts by weight or more, 550 parts by weight or more, 600 parts by weight or more, or about 650 parts by weight or more, relative to 100 parts by weight of the sum of the ester polyol resin and polyisocyanate contents.

As described above, when the thermally conductive filler is used in a high content, the viscosity of the main resin or the curing agent, containing the filler, or the composition comprising them may increase.

As described above, when the viscosity of the resin composition is too high, the injection processability is poor, whereby the physical properties required for the resin layer may not be sufficiently realized throughout the resin layer. In view of this point, it is preferable to use a low-viscosity component which may be liquid or have sufficient flow as the resin component.

In addition to the above, various kinds of fillers can be used. For example, the use of a carbon (-based) filler such as graphite may be considered in order to secure insulation properties of the cured resin layer of the resin composition. Alternatively, a filler such as, for example, fumed silica, clay, calcium carbonate, zinc oxide (ZnO) or aluminum hydroxide ($Al(OH)_3$) can be used. The form or content ratio of the filler is not particularly limited, which may be selected in consideration of the viscosity of the resin composition, the possibility of settling in the resin layer, the thixotropy, the insulating property, the filling effect or the dispersibility.

The composition may further comprise a viscosity controlling agent, such as a thixotropic agent, a diluent, a dispersant, a surface treatment agent or a coupling agent, for adjusting viscosity, if necessary, for example, for raising or lowering viscosity or for controlling viscosity depending on shear force.

The thixotropic agent controls the viscosity of the resin composition depending on the shear force, whereby the process of manufacturing the battery module can be effectively performed. As the usable thixotropic agent, fumed silica and the like can be exemplified.

The diluent or dispersant is usually used for lowering the viscosity of the resin composition, and any of various kinds known in the art can be used without limitation as long as it can exhibit the above action.

The surface treatment agent is for surface treatment of the filler introduced into the resin layer, and any of various kinds known in the art can be used without limitation as long as it can exhibit the above action.

The coupling agent may be used, for example, to improve the dispersibility of the thermally conductive filler such as alumina, and any of various kinds known in the art may be used without limitation as long as it can exhibit the above action.

In addition, the resin composition may further comprise a flame retardant or a flame retardant auxiliary agent. In this case, a known flame retardant may be used without any particular limitation, and for example, a flame retardant in the form of a solid phase or a liquid flame retardant may be applied. The flame retardant includes, for example, organic flame retardants such as melamine cyanurate and inorganic flame retardants such as magnesium hydroxide. When the amount of the filler filled in the resin layer is large, a liquid type flame retardant material (TEP, triethyl phosphate, or TCPP, tris(1,3-chloro-2-propyl)phosphate, etc.) may also be used. In addition, a silane coupling agent capable of acting as a flame retardant synergist may also be added.

In another example for controlling the required viscosity of the resin composition, by controlling the production conditions of the main composition comprising the polyol resin or the curing agent composition comprising the isocyanate, the viscosities of the main composition and the curing agent composition can be controlled, whereby the viscosity of the resin composition, which is a mixed composition of the main composition and the curing agent composition, can also be controlled. In one example, in the case of preparing a main composition comprising a main resin, a filler and a catalyst, the viscosity of the main composition may increase when the mixing time or mixing rpm is increased. In another example, in the case of preparing a curing agent composition comprising an isocyanate and a filler, the viscosity of the curing agent composition may increase when the mixing time or mixing rpm is increased.

The resin composition may comprise the above-described constitutions, and may be a solvent type composition, a water-based composition or a solventless type composition, but considering the convenience of the manufacturing process, the solventless type may be suitable.

The resin composition of the present application may have physical properties suitable for the use as described below after curing. With respect to the physical properties, the expression "after curing" can be used in the same sense as the above-described real curing.

In one example, the resin composition may have predetermined adhesive force ($S_1$) at room temperature after curing. Specifically, the resin layer may have adhesive force of about 150 gf/10 mm or more, 200 gf/10 mm or more, 250 gf/10 mm or more, 300 gf/10 mm or more, 350 gf/10 mm or more, or about 400 gf/10 mm or more. When the adhesive force satisfies the above range, appropriate impact resistance and vibration resistance can be ensured. The upper limit of the resin layer adhesive force is not particularly limited, which may be about 1,000 gf/10 mm or less, 900 gf/10 mm or less, 800 gf/10 mm or less, 700 gf/10 mm or less, 600 gf/10 mm or less, or about 500 gf/10 mm or less or so. When the adhesive force is too high, there is a risk that the pouch portion to which the cured composition is attached will tear. Specifically, in the case where a shock occurs in which the shape of the battery module is deformed due to an accident while driving the vehicle, when the battery cell is attached too strongly through the cured resin layer, dangerous materials inside the battery can be exposed or explode, while the pouch is torn. The adhesive force can be measured with respect to an aluminum pouch. For example, an aluminum pouch used for manufacturing a battery cell is cut to a width of about 10 mm, a resin composition is loaded on a glass plate, and the cut aluminum pouch is loaded thereon so that the resin composition contacts the PET (poly (ethylene terephthalate) surface of the pouch, and then the adhesive force can be measured while the resin composition is cured at 25° C. and 50% RH for 24 hours and the aluminum pouch is peeled off at a peeling angle of 180° and a peeling speed of 300 mm/min with a tensile tester (texture analyzer).

In another example, the adhesive force of the resin composition after curing can be maintained at a considerable level even under high-temperature/high-humidity. Specifically, in the present application, the % ratio $[(S_2/S_1)\times100]$ of the adhesive force ($S_2$) measured by the same method after a high-temperature/high-humidity acceleration test performed under predetermined conditions relative to the adhesive force ($S_1$) measured at room temperature may be 70% or more, or 80% or more. In one example, the high-temperature/high-humidity acceleration test can be measured after storing the same specimen as the specimen used for measuring the room temperature adhesive force for 10 days under conditions of a temperature of 40 to 100° C. and humidity of 75% RH or more. When the adhesive force and the relationship are satisfied, excellent adhesion durability can be maintained even if the use environment of the battery module changes.

In one example, the resin composition can have excellent heat resistance after curing. In this regard, the composition of the present application may have a 5% weight loss temperature of 120° C. or higher at the time of a thermogravimetric analysis (TGA) measured for the cured product of only the resin components in a state of comprising no filler. In addition, the composition of the present application may have an 800° C. balance of 70 wt % or more at the time of a thermogravimetric analysis (TGA) measured for the cured product of the resin composition in a state of comprising the filler. In another example, the 800° C. balance may be about 75 wt % or more, 80 wt % or more, 85 wt % or more, or about 90 wt % or more. In another example, the 800° C. balance may be about 99 wt % or less. At this time, the thermogravimetric analysis (TGA) can be measured within a range of 25 to 800° C. at a temperature raising rate of 20° C./minute under a nitrogen ($N_2$) atmosphere of 60 $cm^3$/minute. The heat resistance characteristics related to the thermogravimetric analysis (TGA) can be secured by controlling the kind of the resin and/or the filler or the content thereof.

In one example, the resin composition can provide excellent electrical insulation after curing. In the battery module structure as described below, when the resin layer exhibits electrical insulation, the performance of the battery module can be maintained and stability can be ensured. For example, when a dielectric breakdown voltage of the cured product is measured 24 hours after mixing the components of the resin composition, the dielectric breakdown voltage may be about 10 kV/mm or more, 15 kV/mm or more, or about 20 kV/mm or more. The higher the value of the dielectric breakdown voltage is, the resin layer shows more excellent insulation, and thus the upper limit is not particularly limited, but may be about 50 kV/mm or less, 45 kV/mm or less, 40 kV/mm or less, 35 kV/mm or less, or about 30 kV/mm or less in consideration of composition of the resin layer or the like. The dielectric breakdown voltage can be measured in accordance with ASTM D149, as described in the following examples. The dielectric breakdown voltage in the above range can be ensured by adjusting, for example, the filler or the resin component used in the resin composition, or the content thereof.

In another example of the present application, the present application relates to a battery module. The module comprises a module case and a battery cell. The battery cell may be housed in the module case. One or more battery cells may be present in the module case, and a plurality of battery cells may be housed in the module case. The number of battery cells housed in the module case is adjusted depending on applications and the like, which is not particularly limited. The battery cells housed in the module case may be electrically connected to each other.

The module case may comprise at least sidewalls and a bottom plate which form an internal space in which the battery cell can be housed. Also, the module case may further comprise a top plate for sealing the internal space. The sidewalls, the bottom plate, and the top plate are integrally formed with each other, or the sidewalls, the bottom plate, and/or the top plate as separated from each other are assembled, so that the module case can be formed. The shape and size of such a module case are not particularly limited and may be appropriately selected depending on applications, or the type and number of the battery cell housed in the internal space, and the like.

Here, since there are at least two plates constituting the module case, the term top plate and bottom plate are terms having relative concepts used to distinguish them. That is, it does not mean that in the actual use state, the top plate necessarily exists at the upper portion and the bottom plate necessarily exists at the lower portion.

FIG. 2 is a view showing an exemplary module case (10), which is an example of a box-shaped case (10) comprising one bottom plate (10a) and four sidewalls (10b). The module case (10) may further comprise a top plate (10c) sealing the internal space.

FIG. 3 is a schematic view of the module case (10) of FIG. 2, as observed from above, in which the battery cells (20) are housed.

A hole may be formed in the bottom plate, the sidewalls, and/or the top plate of the module case. When a resin layer is formed by an injection process, the hole may be an injection hole used for injecting a material for forming the resin layer, that is, the resin composition. The shape, number and position of the hole can be adjusted in consideration of the injection efficiency of the material for forming the resin layer. In one example, the hole may be formed at least on the bottom plate and/or the top plate.

In one example, the hole may be formed at about ¼ to ¾ point or about ⅜ to ⅞ point, or approximately the middle, of the total length of the sidewalls, the bottom plate, or the top plate. By injecting the resin composition through the injection hole formed at this point, the resin layer can be injected so as to have a wide contact area. As shown in FIG. 4, the ¼, ¾, ⅜ or ⅞ point is, for example, a ratio of the distance (A) to the hole forming position relative to the total length (L) measured based on any one end face (E) of the bottom plate or the like. The end (E) at which the length (L) and the distance (A) are formed may be any end (E) as long as the length (L) and the distance (A) are measured from the same end (E). In FIG. 4, the injection hole (50a) is in a form of being located at the approximately middle part of the bottom plate (10a).

The size and shape of the injection hole are not particularly limited, and can be adjusted in consideration of the injection efficiency of a resin layer material. For example, the hole may have a circular shape, an elliptical shape, a polygonal shape such as triangle or square, or an amorphous shape. The number and spacing of the injection hole are not particularly limited and can be adjusted so that the resin layer can have a wide contact area with the bottom plate or the like.

An observation hole (for example, 50b in FIG. 4) may be formed at the end of the top plate and the bottom plate, and the like where the injection hole is formed. For example, when the material of the resin layer is injected through the injection hole, such an observation hole may be formed for observing whether the injected material is injected well to the end of the sidewalls, the bottom plate, or the top plate. The position, shape, size, and number of the observation hole are not particularly limited as long as they are formed so that it can be confirmed whether the injected material is properly injected.

The module case may be a thermally conductive case. The term thermally conductive case means a case in which the thermal conductivity of the entire case is 10 W/mk or more, or at least a portion having the thermal conductivity as above is included. For example, at least one of the sidewalls, the bottom plate or the top plate as described above may have the thermal conductivity described above. In another example, at least one of the sidewalls, the bottom plate, or the top plate may comprise a portion having the thermal conductivity. For example, the battery module of the present application may comprise a first filler-containing cured resin layer in contact with the top plate and the battery cell, and a second filler-containing cured resin layer in contact with the bottom plate and the battery cell, where at least the second filler-containing cured resin layer may be a thermally conductive resin layer, whereby it can be said that at least the bottom plate may have thermal conductivity or may comprise a thermally conductive portion.

Here, the thermal conductivity of the thermally conductive top plate, bottom plate, sidewall or the thermally conductive portion may be about 20 W/mk or more, 30 W/mk or more, 40 W/mk or more, 50 W/mk or more, 60 W/mk or more, 70 W/mk or more, 80 W/mk or more, 90 W/mk or more, 100 W/mk or more, 110 W/mk or more, 120 W/mk or more, 130 W/mk or more, 140 W/mk or more, 150 W/mk or more, 160 W/mk or more, 170 W/mk or more, 180 W/mk or more, 190 W/mk or more, or about 195 W/mk or more. The higher the value of the thermal conductivity is, the more advantageous it is from the viewpoint of the heat dissipation property of the module, and the like, and the upper limit is not particularly limited. In one example, the thermal conductivity may be about 1,000 W/mk or less, 900 W/mk or less, 800 W/mk or less, 700 W/mk or less, 600 W/mk or less, 500 W/mk or less, 400 W/mk or less, 300 W/mk or less, or about 250 W/mk or less, but is not limited thereto. The kind of materials exhibiting the thermal conductivity as above is not particularly limited, and for example, includes metal materials such as aluminum, gold, silver, tungsten, copper, nickel, or platinum. The module case may be comprised entirely of the thermally conductive material as above, or at least a part of the module case may be a portion comprised of the thermally conductive material. Accordingly, the module case may have the above-mentioned range of thermal conductivity, or comprise at least one portion having the aforementioned thermal conductivity.

In the module case, the portion having a thermal conductivity in the above range may be a portion in contact with the resin layer and/or the insulating layer as described below. In addition, the portion having the thermal conductivity may be a portion in contact with a cooling medium such as cooling water. When it has such a structure, heat generated from the battery cell can be effectively discharged to the outside.

Also, the type of the battery cell housed in the module case is not particularly limited, and a variety of known battery cells may be applied. In one example, the battery cell may be a pouch type. Referring to FIG. 5, the pouch type battery cell (100) may typically comprise an electrode assembly, an electrolyte, and a pouch exterior material.

FIG. 5 is an exploded perspective view schematically showing the configuration of an exemplary pouch type cell, and FIG. 6 is a combined perspective view of the configuration of FIG. 5.

The electrode assembly (110) included in the pouch type cell (100) may be in a form in which at least one positive plate and at least one negative plate are disposed with each separator interposed therebetween. The electrode assembly (110) may be a wound type in which one positive plate and one negative plate are wound together with the separator, or a stacked type in which a plurality of positive plates and a plurality of negative plates are laminated alternately with each separator interposed therebetween.

The pouch exterior material (120) may be configured in a form equipped with, for example, an outer insulating layer, a metal layer, and an inner adhesive layer. Such an exterior material (120) protects inner elements such as the electrode assembly (110). The metal layer of the electrode assembly (110) may comprise a metal thin film, such as aluminum, to protect inner elements such as the electrolyte, to complement the electrochemical properties by the electrode assembly (110) and the electrolyte, and to consider heat dissipation or the like. Such a metal thin film may be interposed between insulating layers formed of an insulating material in order to ensure electrical insulation with elements such as the electrode assembly (110) and the electrolyte, or other elements outside the battery (100). In addition, the pouch may further comprise, for example, a polymer resin layer (base material) such as PET.

In one example, the exterior material (120) may comprise an upper pouch (121) and a lower pouch (122), where in at least one of the upper pouch (121) or the lower pouch (122), a concave internal space (I) can be formed. The electrode assembly (110) can be housed in the internal space (I) of this pouch. A sealing portion (S) is provided on each outer peripheral surface of the upper pouch (121) and the lower pouch (122) and these sealing portions (S) are bonded to each other so that the internal space accommodating the electrode assembly (110) can be sealed.

Each electrode plate of the electrode assembly (110) is provided with an electrode tab, and one or more electrode tabs may be connected to an electrode lead. The electrode lead may be interposed between the sealing portions (S) of the upper pouch (121) and the lower pouch (122) and exposed to the outside of the exterior material (120) to function as an electrode terminal of the secondary battery (100).

The shape of the pouch type cell as described above is only one example, and the battery cell applied in the present application is not limited to the above-described kind. In the present application, various shapes of known pouch type cells or other types of cells can be all applied as battery cells.

The battery module of the present application may further comprise a resin layer. Specifically, the battery module of the present application may comprise a cured resin layer in which the filler-containing composition is cured. The cured resin layer may be formed from the resin composition as described above.

The battery module may comprise, as the resin layer, a first filler-containing cured resin layer in contact with the top plate and the battery cell, and a second filler-containing cured resin layer in contact with the bottom plate and the battery cell. One or more of the first or second filler-containing cured resin layers may comprise a cured product of the resin composition as described above, thereby having the predetermined adhesive force, cold resistance, heat resistance, and insulation as described above. In addition, the first and second filler-containing cured resin layers may have the following characteristics.

In one example, the resin layer may be a thermally conductive resin layer. In this case, the thermal conductivity of the thermally conductive resin layer may be about 1.5 W/mK or more, 2 W/mK or more, 2.5 W/mK or more, 3 W/mK or more, 3.5 W/mK or more, or about 4 W/mK or more. The thermal conductivity may be 50 W/mK or less, 45 W/mK or less, 40 W/mK or less, 35 W/mK or less, 30 W/mK or less, 25 W/mK or less, 20 W/mK or less, 15 W/mK or less, 10 W/mK or less, 5 W/mK or less, 4.5 W/mK or less, or about 4.0 W/mK or less. When the resin layer is a thermally conductive resin layer as above, the bottom plate, the top plate and/or the sidewall, and the like to which the resin layer is attached may be a portion having the above-described thermal conductivity of 10 W/mK or more. At this time, the module case portion representing the thermal conductivity may be a part in contact with a cooling medium, for example, cooling water or the like. The thermal conductivity of the resin layer is, for example, a value measured according to ASTM D5470 standard or ISO 22007-2 standard. The thermal conductivity of such a resin layer may be secured, for example, by appropriately adjusting the filler contained in the resin layer and the content thereof, as described above.

In one example, in the battery module, the resin layer or the battery module, to which the resin layer is applied, may have a thermal resistance of about 5 K/W or less, 4.5 K/W or less, 4 K/W or less, 3.5 K/W or less, 3 K/W or less, or about 2.8 K/W. When the resin layer or the battery module, to which the resin layer is applied, is adjusted in order to exhibit the thermal resistance in the above range, excellent cooling efficiency or heat dissipation efficiency can be secured. The method of measuring the thermal resistance is not particularly limited, and for example, the thermal resistance can be measured according to ASTM D5470 standard or ISO 22007-2 standard.

In one example, the resin layer may be a resin layer formed to maintain durability even in a predetermined thermal shock test. For example, when one cycle is composed of holding the battery module at a low temperature of −40° C. for 30 minutes, and then again holding it for 30 minutes after increasing the temperature to 80° C., it may be a resin layer that cannot be peeled off or cracked from the module case or the battery cell of the battery module after the thermal shock test that the cycle is repeated 100 times. For example, when the battery module is applied to a product, such as an automobile, requiring a long guarantee period (for example, about 15 years or more in the case of the automobile), performance may be required in the same level as above for ensuring durability.

In one example, the resin layer may be a flame retardant resin layer. In the present application, the term flame retardant resin layer may mean a resin layer showing a V-0 rating in UL 94 V Test (Vertical Burning Test). This can secure stability against fires and other accidents that may occur in the battery module.

In one example, the resin layer may have a specific gravity of about 5 or less. In another example, the specific gravity may be about 4.5 or less, 4 or less, 3.5 or less, or about 3 or less. The resin layer showing the specific gravity in this range is advantageous for manufacturing a lightweight battery module. The lower the value of the specific gravity is, the more advantageous the lightening of the module is, and thus the lower limit is not particularly limited. For example, the specific gravity can be about 1.5 or more, or about 2 or more. The components added to the resin layer can be adjusted so that the resin layer exhibits the specific gravity in the above range. For example, when the fillers are added, a method of applying fillers capable of securing a desired thermal conductivity even at a low specific gravity, if possible, that is, fillers having a low specific gravity or surface-treated fillers, and the like may be used.

In one example, it is preferable that the resin layer does not contain volatile substances, if possible. For example, the resin layer may have a ratio of non-volatile components of 90 wt % or more, 95 wt % or more, or 98 wt % or more. Here, the non-volatile components and the ratio thereof can be specified in the following manner. That is, the non-volatile component can be defined as the remaining portion after the resin layer is maintained at 100° C. for about 1 hour. Thus, the ratio of the non-volatile component can be measured based on the initial weight of the resin layer and the ratio after the resin layer is maintained at 100° C. for about 1 hour.

In one example, it may be advantageous that the resin layer has a low shrinkage ratio during the process of curing or after curing. This can prevent the occurrence of peeling or voids that may occur during the manufacture or use process of the module. The shrinkage ratio can be appropriately adjusted within a range capable of exhibiting the above-mentioned effect, and can be, for example, less than 5%, less than 3% or less than about 1%. The lower the value of the shrinkage ratio is, the more advantageous the shrinkage ratio is, and thus the lower limit is not particularly limited.

In one example, the resin layer may have a low coefficient of thermal expansion (CTE) to prevent the occurrence of peeling or voids, and the like that may occur during the manufacture or use process of the module. The coefficient of thermal expansion can be, for example, less than about 300 ppm/K, less than 250 ppm/K, less than 200 ppm/K, less than 150 ppm/K or less than about 100 ppm/K. The lower the value of the coefficient of thermal expansion is, the more advantageous the coefficient is, and thus the lower limit is not particularly limited.

In one example, in order to impart good durability or impact resistance to the battery module, the resin layer may have an appropriate level of tensile strength. For example, the resin layer may be configured to have tensile strength of about 1.0 MPa or more.

In one example, the elongation of the resin layer can be suitably adjusted. As a result, it is possible to provide a module having excellent durability by ensuring excellent impact resistance and the like. The elongation can be adjusted, for example, in the range of about 10% or more, or about 15% or more.

In one example, it may be advantageous that the resin layer exhibits an appropriate hardness. For example, if the hardness of the resin layer is too high, the reliability may be adversely affected because the resin layer has a brittle characteristic. When this point is considered, by controlling the hardness of the resin layer, the impact resistance and the vibration resistance can be secured, and the durability of the product can be ensured. The resin layer may have, for example, a hardness in Shore A type of less than about 100, 99 or less, 98 or less, 95 or less, or about 93 or less, or a hardness in Shore D type of less than about 80, about 70 or less, about 65 or less, or about 60 or less. The lower limit of the hardness is not particularly limited. For example, the hardness in Shore A type may be 60 or more, or the hardness in Shore 00 type may be about 5 or more, or about 10 or more or so. The hardness in the above range can be ensured by controlling the content of the filler and the like.

By forming the cured resin layer satisfying the characteristics in the battery module as described above, a battery module having excellent durability against external impact or vibration can be provided.

In the battery module of the present application, at least one of the sidewall, the bottom plate or the top plate in contact with the resin layer may be the above-described thermally conductive sidewall, bottom plate or top plate. On the other hand, in this specification, the term contact may also mean a case where, for example, the top plate, the bottom plate and/or the sidewall or the battery cell is in direct contact with the resin layer, or another element, for example, an insulating layer or the like exists therebetween. In addition, the resin layer in contact with the thermally conductive sidewall, bottom plate or top plate may be in thermal contact with the target. At this time, the thermal contact may mean a state that the resin layer is in direct contact with the bottom plate or the like, or other elements, for example, an insulating layer or the like as described below, between the resin layer and the bottom plate or the like are present, but the other element does not interfere with heat transfer from the battery cell to the resin layer, and from the resin layer to the bottom plate or the like. Here, the phrase "does not interfere with heat transfer" means the case that even when other elements (e.g., an insulating layer or a guiding portion as described below) exists between the resin layer and the bottom plate or the like, the total thermal conductivity of the other elements and the resin layer is about 1.5 W/mK or more, 2 W/mK or more, 2.5 W/mK or more, 3 W/mK or more, 3.5 W/mK or more, or about 4 W/mk or more, or the total thermal conductivity of the resin layer and the bottom plate or the like in contact therewith is included in the range even when the other elements are present. The thermal conductivity of the thermal contact may be about 50 W/mk or less, 45 W/mk or less, 40 W/mk or less, 35 W/mk or less, 30 W/mk or less, 25 W/mk or less, 20 W/mk or less, 15 W/mk or less, 10 W/mk or less, 5 W/mk or less, 4.5 W/mk or less, or about 4.0 W/mk or less. This thermal contact can be achieved by controlling the thermal conductivity and/or the thickness of the other element when the other element is present.

The thermally conductive resin layer may be in thermal contact with the bottom plate or the like and may also be in thermal contact with the battery cell. By adopting such a structure, various fastening parts or cooling equipment of the module, and the like, which was previously required in the construction of a general battery module or a battery pack as an assembly of such modules, is greatly reduced, and simultaneously it is possible to implement a module in which heat dissipation characteristics are ensured and more battery cells are housed per unit volume. Accordingly, the present application can provide a battery module having high power while being more compact and lighter.

FIG. 7 is an exemplary cross-sectional diagram of the battery module. In FIG. 7, the module may be in a form which comprises a case including sidewalls (10b) and a bottom plate (10a); a plurality of battery cells (20) housed inside the case and a resin layer (30) in contact with both the battery cell (20) and the case. FIG. 7 is a diagram of the resin layer (30) existing on the side of the bottom plate (10a), but the battery module of the present application may also comprise a resin layer located on the side of the top plate in the same form as FIG. 7.

In the above structure, the bottom plate or the like in contact with the resin layer (30) may be the thermally conductive bottom plate or the like as described above.

The contact area between the resin layer and the bottom plate or the like may be about 70% or more, about 75% or more, about 80% or more, about 85% or more, about 90% or more, or about 95% or more, relative to the total area of the bottom plate or the like. The upper limit of the contact area is not particularly limited, and may be, for example, 100% or less, or less than about 100%.

When the top plate or the bottom plate is thermally conductive and the cured resin layer in contact therewith is also thermally conductive, the thermally conductive portion or the thermally conductive bottom plate or the like may be a portion in contact with a cooling medium such as cooling water. That is, as schematically shown in FIG. 7, the heat (H) can be easily discharged to the bottom plate or the like by the above structure, and heat release can be easily performed even in more simplified structures by contacting this bottom plate or the like with the cooling medium (CW).

The resin layer may have a thickness in a range of, for example, about 100 μm to 5 mm or in a range of about 200 μm to 5 mm. In the structure of the present application, the thickness of the resin layer may be set to an appropriate thickness in consideration of the desired heat dissipation characteristics or durability. The thickness may be the thickness of the thinnest portion of the resin layer, the thickness of the thickest portion, or the average thickness.

As shown in FIG. 7, a guiding portion (10d) which can guide the housed battery cell (20) may also be present on at least one surface of the inside of the module case, for example, a surface of bottom plate (10a) in contact with the resin layer (30). At this time, the shape of the guiding portion (10d) is not particularly limited, and an appropriate shape can be employed in consideration of the shape of the battery cell to be applied. The guiding portion (10d) may be integrally formed with the bottom plate or the like, or may be attached separately thereto. The guiding portion (10d) may be formed using a thermally conductive material, for example, a metallic material such as aluminum, gold, silver, tungsten, copper, nickel, or platinum in consideration of the above-described thermal contact. In addition, although not shown in the drawings, an interleaf or an adhesive layer may also be present between the housed battery cells (20). Here, the interleaf can act as a buffer upon charging and discharging the battery cell.

In one example, the battery module may further comprise an insulating layer between the module case and the battery cell or between the resin layer and the module case. FIG. 8 illustratively shows a case where the insulating layer is formed between the guiding portion (10d) formed on the bottom plate (10a) of the case and the resin layer (30). By adding an insulating layer, it is possible to prevent problems such as an electrical short phenomenon or a fire due to a contact between the cell and the case by an impact that may occur during use. The insulating layer may be formed using an insulating sheet having high insulation and thermal conductivity, or may be formed by applying or injecting a material exhibiting insulating properties. For example, in a method for manufacturing a battery module as described below, a process of forming an insulating layer may be performed before the injection of the resin composition. A so-called TIM (thermal interface material) or the like may be applied in forming the insulating layer. Alternatively, the insulating layer may be formed of an adhesive material, and for example, the insulating layer may also be formed using a resin layer having little or no filler such as thermally conductive fillers. As the resin component which can be used for forming the insulating layer, an acrylic resin, PVC (poly(vinyl chloride)), an olefin resin such as PE (polyethylene), an epoxy resin, silicone or a rubber component such as an EPDM (ethylene propylene diene monomer) rubber, and the like can be exemplified, without being limited thereto. The insulating layer may have an insulation breakdown voltage, as measured according to ASTM D149, of about 5 kV/mm or more, 10 kV/mm or more, 15 kV/mm or more, 20 kV/mm or more, 25 kV/mm or more, or about 30 kV/mm or more. The higher the value of the dielectric breakdown voltage is, the better the insulation shows, and thus it is not particularly limited. For example, the dielectric breakdown voltage of the insulating layer may be about 100 kV/mm or less, 90 kV/mm or less, 80 kV/mm or less, 70 kV/mm or less, or about 60 kV/mm or less. The thickness of the insulating layer can be set to an appropriate range in consideration of the insulating property and the thermal conductivity of the insulating layer, and the like, and for example, may be about 5 μm or more, 10 μm or more, 20 μm or more, 30 μm or more, 40 μm or more, 50 μm or more, 60 μm or more, 70 μm or more, 80 μm or more, or about 90 μm or more or so. In addition, the upper limit of the thickness is not particularly limited and may be, for example, about 1 mm or less, 200 μm or less, 190 μm or less, 180 μm or less, 170 μm or less, 160 μm or less, or about 150 μm or less.

In another example of the present application, the present application relates to a method for manufacturing a battery module, for example, the above-mentioned battery module.

The manufacturing method of the present application may comprise steps of injecting a resin composition into the above-described module case; housing a battery cell in the module case, and curing the resin composition to form the resin layer.

The order of the step of injecting the resin composition into the module case and the step of housing the battery cell in the module case is not particularly limited. For example, the resin composition may be first injected into the module case, followed by housing the battery cell in that state, or the battery cell may be first housed inside the module case, followed by injecting the resin composition therein.

As the resin composition, the above-mentioned resin composition can be used.

The method of injecting the resin composition into the module case is not particularly limited, and a known method can be applied. For example, a resin composition may be injected by pouring the resin composition into an opening of a module case, or a method of injecting a resin composition by the above-described injection hole formed on a module case, a method of applying a resin composition to both a battery cell and a battery module, and the like may be applied. For proper fixing, the injection process may also be performed while constantly vibrating the battery module or the battery cell.

The manner, in which the battery cell is housed in the module case into which the resin composition is injected or in the module case before the composition is injected, is not particularly limited.

The housing of the battery cells can be performed by arranging the battery cells at suitable positions in the module case in consideration of the desired arrangement and the like. In addition, when the cartridge structure is present, the step can be performed by placing the battery cells at proper positions of the cartridge structure, or inserting the cartridge structure, in which the battery cells are located, into the module case.

After the battery cells are housed therein, adhesion between the battery cells or adhesion between the battery cells and the module case can be achieved by curing the injected resin composition. The manner of curing the resin composition is not particularly limited. In one example, when the composition is used, the resin composition can be cured by a method of holding the resin composition at room temperature for a predetermined time (about 24 hours). The curing may also be accelerated by applying heat for a certain period of time at such a level as not to impair the thermal stability of the cell. For example, by applying heat at a temperature of less than 60° C., more specifically, in a range of about 30° C. to 50° C., before curing or during the curing process, or before housing the battery cell or during the housing process, the takt time can be reduced and the processability can be improved. The cured product capable of achieving adhesion between battery cells or achieving adhesion between the battery cell and the module case may have a conversion rate of at least 80% or more, as described above.

In another example of the present application, the present application relates to a battery pack, for example, a battery pack comprising two or more battery modules as described above. In the battery pack, the battery modules may be electrically connected to each other. A method of electrically connecting two or more battery modules to constitute a battery pack is not particularly limited, and all known methods can be applied thereto.

The present application also relates to a device comprising the battery module or the battery pack. An example of such a device may include, but is not limited to, automobiles such as electric vehicles, and may be devices for all applications requiring secondary batteries as power. In addition, a method of constructing the automobile using the battery module or the battery pack is not particularly limited, and a general method known in the related art can be applied.

Advantageous Effects

According to one example of the present application, a resin composition is provided, which can have excellent injection processability into a battery module and prevent overload of the injection equipment by showing a load value and a load change rate of a reference resin composition. In addition, the composition has excellent insulation, heat dissipation, and adhesion after curing.

BRIEF DESCRIPTION OF DRAWINGS

FIG. 1 shows an exemplary mixing machine, which can be applied in the present application.

FIG. 2 shows an exemplary module case, which can be applied in the present application.

FIG. 3 schematically shows a form in which battery cells are housed in a module case.

FIG. 4 schematically shows an exemplary bottom plate where injection holes and observation holes are formed.

FIGS. 5 and 6 schematically show an exemplary battery pouch which can be used as a battery cell.

FIGS. 7 and 8 schematically show the structure of an exemplary battery module.

FIG. 9 is a photograph of an exemplary mixing machine.

FIG. 10 is a photograph of an exemplary static mixer applied to a mixing machine.

MODE FOR INVENTION

Hereinafter, the resin composition of the present application will be described with reference to examples and comparative examples, but the scope of the present application is not limited by the following range.

Evaluation Methods

1. Viscosity/TI

A viscosity was measured at room temperature and a shear rate condition of from 0.01/s to 10.0/s using a rheological property measuring machine (ARES). The viscosity mentioned in the examples is a viscosity at a point of a shear rate of 2.5/s, where a TI (thixotropic index) can be determined through a ratio of a viscosity at a point of a shear rate of 0.25/s to a viscosity at a point of a shear rate of 2.5/s.

2. Load Value and Load Change Rate

A load value (kgf) of a resin composition was measured using a mixing machine (1) constructed by combining two cartridges (2a, 2b) and one static mixer (5), as shown in FIG. 1.

In the mixing machine constructed as shown in FIG. 1, as the cartridges (2a, 2b) (Sulzer, AB050-01-10-01), those, in which the resin injection parts were each in a circle with a diameter of 18 mm and the discharge parts (4a, 4b) were each in a circle with a diameter of 3 mm, the height of the cartridges (2a, 2b) was 100 mm and the internal volume was 25 ml, were used. Also, as the static mixer (5) (Sulzer, MBH-06-16T), one, in which the discharge part (7) was in a circle with a diameter of 2 mm, was used. The static mixer is of the stepped type, and the number of elements is 16. FIG. 9 is a photograph of the above-manufactured mixing machine, and FIG. 10 is a photograph of the static mixer which is applied to the relevant mixing machine.

In the structure as shown in FIG. 1, TAs (texture analyzers) were applied as the pressurizing means (3, 3a, 3b).

After a main resin was charged into any one of two cartridges (2a, 2b) and a curing agent was charged into the other cartridge, they were mixed in the static mixer (5) via the discharge parts (4a, 4b) by applying the constant force with the pressurizing means (3, 3a, 3b) and then, the load value was measured while allowing the mixture to be discharged to the discharge part (7).

With regard to the initial load value (Li), the main resin and the curing agent were injected into the two cartridges, respectively, injected into the static mixer (5) by pressurizing the cartridges at a uniform velocity of 1 mm/s by TAs (texture analyzers) (3a, 3b), and mixed in the mixer (5) and then the force required for the pressurizing means was measured from the first discharge time, whereby the maximum value at the point where the force had the maximum value was set as the initial load value (Li). The maximum value is the maximum value that is first confirmed in the process, which is the maximum value at the point where the required force is increased and then decreased initially, or the maximum value at the point where it is initially converged. Then, when the times at which the maximum value is confirmed by two pressurizing means (3a, 3b) are different, the initial load value (Li) is the maximum value that is first confirmed.

With regard to the aging load value (Lf), the main resin and the curing agent were each injected into the static mixer (5) by pressurizing means (TAs, 3a, 3b) in the same manner as above, the pressurization was stopped at the time when the resin composition injected into the static mixer (5) become 95% or so of the capacity (volume) of the static mixer (5), the mixer was again pressurized at a uniform velocity of 1 mm/s by the TAs (texture analyzers) (3a, 3b) after the stopping time of 3 minutes had elapsed, and the required force was measured from the time when the resin composition was first discharged through a discharge part of the static mixer, whereby the maximum value at the point where the force has the maximum value was set as the aging load value (Lf). The maximum value is the maximum value that is first confirmed in the process, which is the maximum value at the point where the required force is increased and then decreased initially, or the maximum value at the point where it is initially converged. Then, when the times at which the maximum value is confirmed by two pressurizing means (3a, 3b) are different, the aging load value (Lf) is the maximum value that is first confirmed.

The load change ratio (Lf/Li) can be determined via the ratio of the initial load value (Li) measured immediately after the main resin and the curing agent are mixed to the aging load value (Lf) measured at 3 minutes after the main resin and the curing agent are mixed.

3. Processability

When the filling time for dispensing was within 3 minutes and there was no overflow in the jig manufactured by dispensing, it was indicated by 0; and when the filling time for dispensing had passed 3 minutes, or when overflow occurred in the jig manufactured by dispensing, it was indicated by X.

4. Equipment Load

When the aging load value (kgf) measured at 3 minutes after the main resin and the curing agent were mixed exceeded 50 kgf, when the deformation in the equipment material itself, such as warpage occurrence in the equipment material, was caused, or when noise was generated in the equipment, it was indicated by X, and if not applicable, it was indicated by 0.

Example 1

Main resin: As the main resin, a mixture was used, in which a filler and a catalyst were mixed with a polyol as a caprolactone-based polyol represented by the following formula 2, wherein the number of repeating units (m in Formula 2) was about 1 to 3 or so, $R_1$ and $R_2$ were each an alkylene with 4 carbon atoms and the polyol-derived unit (Y in Formula 2) comprised a 1,4-butanediol unit, as described below.

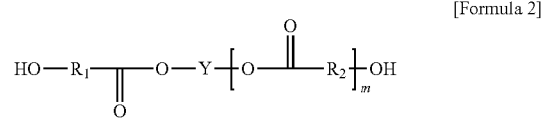

[Formula 2]

Curing agent: As the curing agent, a mixture was used, in which a filler was mixed with a polyisocyanate (HDI, hexamethylene diisocyanate).

Filler: As the filler, an alumina filler was used, and the alumina filler in an amount of about 700 parts by weight relative to 100 parts by weight of the sum of the polyol resin and the polyisocyanate was divided into the same amount and formulated to the main resin and the curing agent.

Catalyst: Dibutyltin dilaurate (DBTDL) was formulated to the main resin in an amount as shown in Table 2 and used.

The main resin was prepared by mixing the polyol resin, the alumina filler and the catalyst in a planetary mixer. The mixing time and the mixing speed (rpm) of the planetary mixer applied at the time of mixing are as summarized in Table 1 below. On the other hand, the curing agent was prepared by mixing the polyisocyanate and the filler with the planetary mixer, where the mixing time and speed (rpm) were summarized in Table 1 below.

The load value was measured with the two-component composition, comprising the main resin and the curing agent, thus prepared.

Example 2

A two-component composition was prepared in the same manner as in Example 1, except that the amounts of the filler and the catalyst and the mixing conditions were adjusted as shown in Tables 1 and 2 below, which was applied to measurement of a load value.

Example 3

A two-component composition was prepared in the same manner as in Example 1, except that the amounts of the filler and the catalyst and the mixing conditions were adjusted as shown in Tables 1 and 2 below, which was applied to measurement of a load value.

Example 4

A two-component composition was prepared in the same manner as in Example 1, except that the amounts of the filler and the catalyst and the mixing conditions were adjusted as shown in Tables 1 and 2 below, which was applied to measurement of a load value.

Comparative Example 1

A two-component composition was prepared in the same manner as in Example 1, except that the amounts of the filler and the catalyst and the mixing conditions were adjusted as shown in Tables 1 and 2 below, which was applied to measurement of a load value.

Comparative Example 2

A two-component composition was prepared in the same manner as in Example 1, except that the amounts of the filler and the catalyst and the mixing conditions were adjusted as shown in Tables 1 and 2 below, which was applied to measurement of a load value.

Comparative Example 3

A two-component composition was prepared in the same manner as in Example 1, except that the amounts of the filler and the catalyst and the mixing conditions were adjusted as shown in Tables 1 and 2 below, which was applied to measurement of a load value.

In Table 1 below, the viscosity was the viscosity of the resin composition obtained by mixing the prepared main resin and curing agent and the filler amount was a part by weight relative to 100 parts by weight of the sum of the polyol resin in the main resin and the polyisocyanate in the curing agent, and this amount of filler was bisected, where the half was mixed with the base resin and the other half was mixed with the curing agent. In addition, the relative value of the catalyst in Table 1 means the content of the catalyst in the entire resin composition. It can be confirmed from Table 1 below that the viscosity of the final resin composition can be controlled by adjusting the amount of filler to be formulated and the mixing conditions.

TABLE 1

|  |  | Filler amount (part by weight) | Catalyst content relative value (wt %) | Preparation condition of main composition | | Preparation condition of curing agent composition | |
| --- | --- | --- | --- | --- | --- | --- | --- |
|  |  |  |  | Mixing time | Mixing rpm | Mixing time | Mixing rpm |
| Example | 1 | 700 | 0.1 | 4 | 10 | 4 | 10 |
|  | 2 | 700 | 0.1 | 6 | 5 | 6 | 5 |
|  | 3 | 700 | 0.12 | 3 | 10 | 3 | 10 |
|  | 4 | 700 | 0.3 | 4 | 10 | 4 | 10 |
| Comparative Example | 1 | 600 | 0.2 | 4 | 10 | 4 | 10 |
|  | 2 | 800 | 0.1 | 4 | 10 | 4 | 10 |
|  | 3 | 700 | 0.3 | 4 | 5 | 4 | 5 |

TABLE 2

|  |  | Viscosity (cP) | TI | Load value (Li) (kgf) | Load value (Lf) (kgf) | Load change rate (Lf/Li) |
| --- | --- | --- | --- | --- | --- | --- |
| Example | 1 | 250,000 | 2.2 | 22 | 28 | 1.27 |
|  | 2 | 310,000 | 1.5 | 35 | 39 | 1.11 |
|  | 3 | 200,000 | 2.6 | 15 | 25 | 1.67 |
|  | 4 | 260,000 | 2.3 | 19 | 48 | 2.53 |
| Comparative Example | 1 | 120,000 | 1.2 | 8 | 28 | 3.50 |
|  | 2 | 450.000 | 3.0 | 42 | 49 | 1.17 |
|  | 3 | 240,000 | 1.3 | 13 | 65 | 5.0 |

TABLE 3

|  |  | Processability | Equipment load |
| --- | --- | --- | --- |
| Example | 1 | ○ | ○ |
|  | 2 | ○ | ○ |
|  | 3 | ○ | ○ |
|  | 4 | ○ | ○ |
| Comparative Example | 1 | X(Overflow) | ○ |
|  | 2 | X(Filling time for 3 minutes or more) | ○ |
|  | 3 | ○ | X |

From Tables 2 and 3 above, it can be seen that Examples 1 to 4 of the present application satisfying the conditions related to the load value and the load change rate have excellent processability and no generated equipment load, but in the case of Comparative Examples 1 to 3 which do not satisfy the conditions of the load value and the load change rate, the processability is not good or the equipment is loaded.

Specifically, when the initial load value is less than 10 as in Comparative Example 1, the overflow can occur in the jig due to insufficient curing of the resin composition, and when the initial load value exceeds 40 as in Comparative Example 2, the filling time of the resin composition can be over 3 minutes due to over-curing of the resin composition. Then, when the aging load (Lf) measured 3 minutes after the main resin and the curing agent are mixed exceeds 50 kgf in Comparative Example 3 or the load change rate exceeds 3, the warpage of the equipment material itself and/or the noise can occur.

The invention claimed is:

1. A resin composition comprising a main resin and a curing agent,
wherein the main resin comprises a polyol resin comprising an ester polyol resin, the curing agent comprises a polyisocyanate, and at least one of the main resin or the curing agent comprises a filler in an amount of 100 parts by weight to 2,000 parts by weight relative to 100 parts by weight of the sum of the polyol resin and the polyisocyanate, and
wherein the resin composition satisfies Equations 1 and 2:

$$10 \leq \text{initial load value}(Li) \leq 40 \quad \text{[Equation 1]}$$

$$1 \leq \text{load change rate}(Lf/Li) \leq 3 \quad \text{[Equation 2]}$$

wherein, Li is an initial load value (kgf) measured immediately after the main resin and the curing agent are mixed and Lf is an aging load value (kgf) measured at 3 minutes after the main resin and the curing agent are mixed.

2. The resin composition according to claim 1, wherein Lf is 50 kgf or less.

3. The resin composition according to claim 1, wherein when a viscosity is measured in a shear rate range of 0.01 to 10.0/s at room temperature within 60 seconds after mixing the main resin and the curing agent, the viscosity measured at a point of 2.5/s is 150,000 to 500,000 cP.

4. The resin composition according to claim 1, wherein a thixotropic index measured at room temperature within 60 seconds after mixing the main resin and the curing agent is 1.5 or more.

5. The resin composition according to claim 1, wherein the polyol resin has a viscosity measured at a point of 2.5/s, of less than 10,000 cP, as measured at room temperature in a shear rate range of 0.01 to 10.0/s.

6. The resin composition according to claim 1, wherein both the main resin and the curing agent comprises the filler.

7. The resin composition according to claim 1, wherein the ester polyol resin is represented by the following formula 1 or 2:

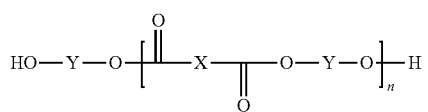
[Formula 1]

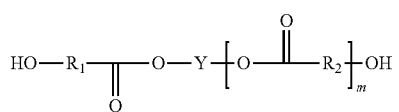
[Formula 2]

wherein, X is a carboxylic acid-derived unit, Y is a polyol-derived unit, n is a number in a range of 2 to 10, m is a number in a range of 1 to 10, and $R_1$ and $R_2$ are each independently an alkylene having 1 to 14 carbon atoms.

8. The resin composition according to claim 7, wherein the carboxylic acid-derived unit X is derived from one or more compounds selected from the group consisting of a fatty acid compound, an aromatic compound having two or more carboxyl groups, an alicyclic compound having two or more carboxyl groups and an aliphatic compound having two or more carboxyl groups.

9. The resin composition according to claim 8, wherein the aromatic compound having two or more carboxyl groups is phthalic acid, isophthalic acid, terephthalic acid, trimellitic acid, or tetrachlorophthalic acid.

10. The resin composition according to claim 8, wherein the alicyclic compound having two or more carboxyl groups is tetrahydrophthalic acid or hexahydrophthalic acid.

11. The resin composition according to claim 8, wherein the aliphatic compound having two or more carboxyl groups is oxalic acid, adipic acid, azelaic acid, sebacic acid, succinic acid, malic acid, glutaric acid, malonic acid, pimelic acid, suberic acid, 2,2-dimethylsuccinic acid, 3,3-dimethylglutaric acid, 2,2-dimethylglutaric acid, maleic acid, fumaric acid or itaconic acid.

12. The resin composition according to claim 7, wherein the polyol-derived unit Y is derived from one or more compounds selected from the group consisting of an alicyclic compound having two or more hydroxyl groups and an aliphatic compound having two or more hydroxyl groups.

13. The resin composition according to claim 12, wherein the alicyclic compound having two or more hydroxyl groups is 1,3-cyclohexanedimethanol or 1,4-cyclohexanedimethanol.

14. The resin composition according to claim 12, wherein the aliphatic compound having two or more hydroxyl groups is ethylene glycol, propylene glycol, 1,2-butylene glycol, 2,3-butylene glycol, 1,3-propanediol, 1,3-butanediol, 1,4-butanediol, 1,6-hexanediol, neopentyl glycol, 1,2-ethylhexyldiol, 1,5-pentanediol, 1,9-nonanediol, 1,10-decanediol, glycerin or trimethylol propane.

15. The resin composition according to claim 1, wherein the polyisocyanate is an alicyclic polyisocyante, a carbodiimide-modified alicyclic polyisocyanate or an isocyanurate-modified alicyclic polyisocyanate.

16. The resin composition according to claim 1, wherein the filler comprises fumed silica, clay, calcium carbonate ($CaCO_3$), zinc oxide (ZnO), aluminum hydroxide ($Al(OH)_3$), alumina ($Al_2O_3$), aluminum nitride, boron nitride, silicon nitride, SiC, BeO or a carbon filler.

17. A battery module comprising a module case having a top plate, a bottom plate and sidewalls, wherein an inner space is formed by the top plate, the bottom plate, and the sidewalls;
a plurality of battery cells existing in the inner space of the module case; and
a resin layer, which is a cured layer of the resin composition according to claim 1 and contacts at least one of the plurality of battery cells, the bottom plate or the sidewalls.

18. A method for manufacturing a battery module comprising steps of:
injecting the resin composition according to claim 1 into a module case having a top plate, a bottom plate and sidewalls, wherein an inner space is formed by the top plate, the bottom plate and the sidewalls;
housing a plurality of battery cells in the module case; and
curing the resin composition.

* * * * *